United States Patent
Choi et al.

(10) Patent No.: US 10,051,573 B2
(45) Date of Patent: Aug. 14, 2018

(54) METHOD AND APPARATUS FOR CONTROLLING POWER CONSUMPTION OF WIRELESS TERMINAL

(71) Applicants: Samsung Electronics Co., Ltd, Gyeonggi-do (KR); SEOUL NATIONAL UNIVERSITY R&DB FOUNDATION, Seoul (KR)

(72) Inventors: Sunghyun Choi, Seoul (KR); Won-Bo Lee, Seoul (KR); Jong-Hoe Koo, Seoul (KR); Yong-Seok Park, Seoul (KR); Ok-Seon Lee, Gyeonggi-do (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 187 days.

(21) Appl. No.: 15/022,883

(22) PCT Filed: Sep. 17, 2014

(86) PCT No.: PCT/KR2014/008659
§ 371 (c)(1),
(2) Date: Jul. 5, 2016

(87) PCT Pub. No.: WO2015/041464
PCT Pub. Date: Mar. 26, 2015

(65) Prior Publication Data
US 2016/0309412 A1    Oct. 20, 2016

(30) Foreign Application Priority Data

Sep. 17, 2013    (KR) ........................ 10-2013-0111986

(51) Int. Cl.
*G08C 17/00* (2006.01)
*H04W 52/02* (2009.01)
(Continued)

(52) U.S. Cl.
CPC ..... *H04W 52/0222* (2013.01); *H04L 41/0681* (2013.01); *H04L 69/22* (2013.01);
(Continued)

(58) Field of Classification Search
CPC ........... H04W 52/0222; H04W 40/005; H04W 72/0473; H04W 52/0212; H04W 88/08;
(Continued)

(56) References Cited

U.S. PATENT DOCUMENTS

| 8,121,634 | B2 * | 2/2012 | Aoyama | ............ | H04W 76/048 |
| | | | | | 370/327 |
| 2003/0117968 | A1 * | 6/2003 | Motegi | ............ | H04W 52/0229 |
| | | | | | 370/311 |

(Continued)

FOREIGN PATENT DOCUMENTS

| JP | 2003-179539 | 6/2003 |
| KR | 10-2012-0015228 | 2/2012 |

(Continued)

OTHER PUBLICATIONS

International Search Report dated Dec. 5, 2014 in connection with International Patent Application No. PCT/KR2013/008659, 15 pages.

*Primary Examiner* — Afshawn M Towfighi

(57) ABSTRACT

The present invention relates to a method for reducing power consumption of a wireless terminal, comprising the operations of: when receiving a triggering packet from the wireless terminal, estimating parameters related to reduction of the power consumption of the wireless terminal; when receiving a condition including a required reduction amount for the power consumption, determined on the basis of the parameters, and time delay related information, setting a clustering cycle corresponding to the condition; and per- (Continued)

forming a wireless communication with the wireless terminal on the basis of the clustering cycle.

22 Claims, 21 Drawing Sheets

(51) Int. Cl.
  *H04L 12/24* (2006.01)
  *H04L 29/06* (2006.01)
  *H04W 40/00* (2009.01)
  *H04W 72/04* (2009.01)
  *H04W 84/12* (2009.01)
  *H04W 88/02* (2009.01)
  *H04W 88/08* (2009.01)

(52) U.S. Cl.
  CPC ........... *H04L 69/28* (2013.01); *H04W 40/005* (2013.01); *H04W 52/0212* (2013.01); *H04W 72/0473* (2013.01); *H04W 84/12* (2013.01); *H04W 88/02* (2013.01); *H04W 88/08* (2013.01); *Y02D 70/00* (2018.01); *Y02D 70/1262* (2018.01); *Y02D 70/142* (2018.01)

(58) Field of Classification Search
  CPC ...... H04W 84/12; H04W 88/02; Y02B 60/50; H04L 41/0681; H04L 69/28; H04L 69/22
  See application file for complete search history.

(56) References Cited

U.S. PATENT DOCUMENTS

| | | |
|---|---|---|
| 2007/0004436 A1 | 1/2007 | Stirbu |
| 2012/0157153 A1* | 6/2012 | Song ................ H04W 52/0245 455/522 |
| 2013/0142098 A1 | 6/2013 | Kwon et al. |
| 2016/0029310 A1 | 1/2016 | Kim et al. |

FOREIGN PATENT DOCUMENTS

| | | |
|---|---|---|
| KR | 10-2012-0052179 | 5/2012 |
| KR | 10-2012-0067856 | 6/2012 |

* cited by examiner

METHOD AND APPARATUS FOR CONTROLLING POWER CONSUMPTION OF WIRELESS TERMINAL

CROSS-REFERENCE TO RELATED APPLICATION(S)

The present application claims priority under 35 U.S.C. § 365 to International Patent Application No. PCT/KR2014/008659 filed Sep. 17, 2014, entitled "METHOD AND APPARATUS FOR CONTROLLING POWER CONSUMPTION OF WIRELESS TERMINAL", and, through International Patent Application No. PCT/KR2014/008659, to Korean Application No. 10-2013-0111986 filed Sep. 17, 2013, each of which are incorporated herein by reference into the present disclosure as if fully set forth herein.

TECHNICAL FIELD

The present invention relates to a method and an apparatus for reducing the power consumption of a wireless terminal.

BACKGROUND ART

General wireless terminals may be used regardless of the movement and location of the user. In addition, the wireless terminals have recently been used for various purposes, such as videos or wireless data, as well as a voice service. Accordingly, the wireless terminals that adopt functions for processing a variety of information at a high data transmission rate have been developed. Therefore, in the case of using the wireless terminals that are mainly driven by the power from a mounted or embedded battery, a power control method for reducing the power consumption, even with the same operation, is required in order to increase the operating time without the supply of power from the outside.

DETAILED DESCRIPTION OF THE INVENTION

Technical Problem

The present invention proposes a method and an apparatus for efficiently controlling the power consumption of the wireless terminal.

The present invention proposes a method and an apparatus for estimating power consumption-related information of the wireless terminal, and transmitting and receiving wireless data according to a condition that is set based on the same in order to reduce the power consumption of the wireless terminal.

Technical Solution

In accordance with an aspect of the present invention, a method for reducing the power consumption of a wireless terminal may include: when receiving a triggering packet from the wireless terminal, estimating parameters that are related to the reduction in the power consumption of the wireless terminal; when receiving a condition that contains the reduction amount of power consumption and delay time-related information, which is determined based on the parameters, setting a cycle for clustering packets to be transmitted to the wireless terminal to correspond to the condition; and performing wireless communication with the wireless terminal based on the set cycle.

In accordance with another aspect of the present invention, a method for reducing the power consumption of a wireless terminal may include: instructing a server, which supports an application for applying the reduction in the power consumption, to estimate parameters that are related to the reduction in the power consumption; when receiving information related to the parameters from the server, setting a condition that contains the reduction amount of power consumption and delay time-related information based on the parameters; and performing wireless communication with the wireless terminal according to a cycle for clustering packets to be transmitted to the wireless terminal, which is set to correspond to the condition.

In accordance with another aspect of the present invention, a server for reducing the power consumption of a wireless terminal may include: a control unit that, when receiving a triggering packet from the wireless terminal, estimates parameters that are related to the reduction in the power consumption of the wireless terminal, and when receiving a condition that contains the reduction amount of power consumption and delay time-related information, which is determined based on the parameters, sets a cycle for clustering packets to be transmitted to the wireless terminal to correspond to the condition; and a transmitting/receiving unit that performs wireless communication with the wireless terminal based on the set cycle under the control of the control unit.

In accordance with another aspect of the present invention, a wireless terminal for reducing the power consumption may: instruct a server, which supports an application for applying the reduction in the power consumption, to estimate parameters that are related to the reduction in the power consumption; when receiving information related to the parameters from the server through a transmitting/receiving unit, set a condition that contains the reduction amount of power consumption and delay time-related information based on the parameters; and include a transmitting/receiving unit that performs wireless communication with the wireless terminal according to a cycle for clustering packets to be transmitted to the wireless terminal, which is set to correspond to the condition under the control of the control unit.

Advantageous Effects

Once the modeling for the amount of power consumption of the wireless terminal is performed, according to the embodiment of the present invention as describe above, when it is required to obtain the power consumption of the wireless terminal according to wireless communication of the wireless terminal, the power consumption of the corresponding terminal does not need to be separately measured, and may be estimated only by log information about the packet generation cycle in the terminal. In addition, in the case where the traffic of the corresponding terminal is able to be captured through the packet sniffer, the energy consumption of the terminal may be estimated from the captured trace information without accessing the terminal. In the case of applying such an energy model to a network simulator, such as NS-3, the power consumption due to the wireless communication of the terminal may be simulated.

In addition, the driving time of an inactivation timer and a wake-up cycle may be estimated for each wireless terminal and each wireless access network, and the traffic occurring in the server may be controlled based on the estimated values in order to thereby reduce the power consumption for a desired additional delay time. FIG. 16a and FIG. 16b are graphs showing the distribution of the amount of power consumption according to a packet transmission/reception pattern between a measuring server and a wireless terminal when the driving time of the inactivation timer is 200 ms and the wake-up cycle is 307.2 ms in WiFi, as an example of the access network. More specifically, FIG. 16a shows a power consumption graph when transmitting and receiving UDP packets of 1450 bytes in a cycle of 20 ms between the measuring server and the wireless terminal, and FIG. 16b shows a power consumption graph when clustering thirty UDP packets having 1450 bytes of FIG. 16a, and transmitting and receiving a packet of 43500 bytes in a cycle of 615 ms between the server and the wireless terminal, according to the embodiment of the present invention. Both FIG. 16a and FIG. 16 show an average transmission rate of 580 kbps. However, referring to FIG. 16b, a WiFi chip set is controlled to remain in the power-off state in a time period of more than a single wake-up cycle (for example, 307.2 ms) in order to thereby obtain the average power saving effect of approximately 43% compared to FIG. 16a.

FIG. 17 shows a graph of the average amount of power consumption compared to the clustering cycle in the experimental environment of FIG. 16b.

FIG. 17 shows the case where the transmission is made in a packet cluster unit that is a bundle of thirty packets in every clustering cycle, according to the embodiment of the present invention, compared to FIG. 6b in which a single packet is transmitted in every packet transmission period, according to the embodiment of the present invention. FIG. 17 also illustrates that the transmission is made in a packet cluster unit so that the average amount of power consumption for each time period is significantly reduced.

BRIEF DESCRIPTION OF THE DRAWINGS

FIG. 5b is a graph showing an example of the distribution of an RTT that is measured for each of the UDP packets transmitted to correspond to FIG. 5a.

MODE FOR CARRYING OUT THE INVENTION

Figure 1:
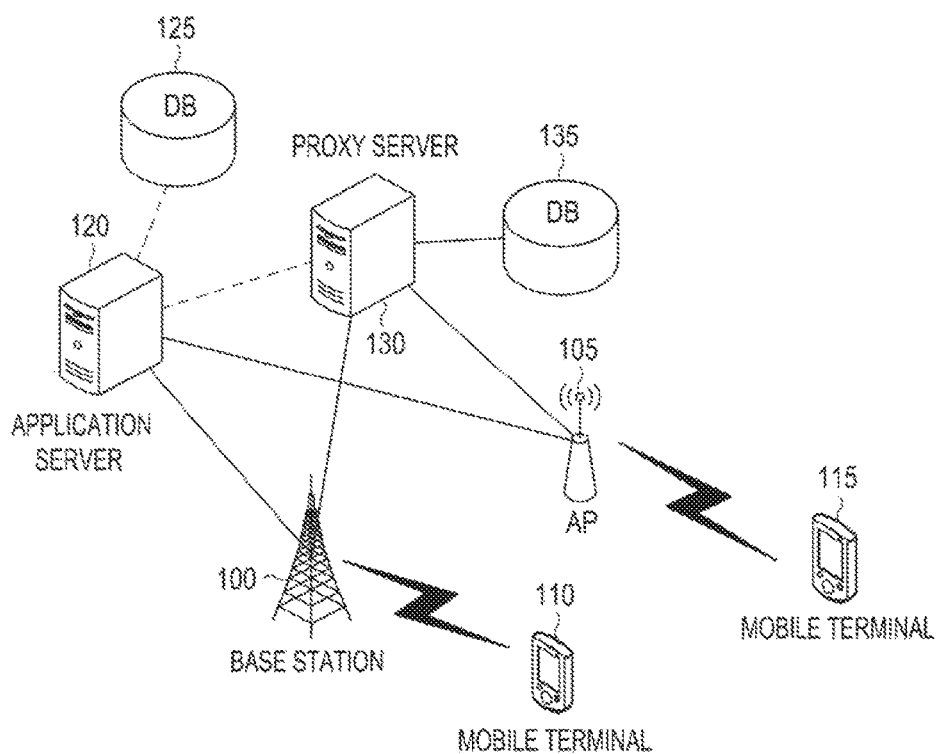
FIG. 1 illustrates an example of a system configuration, according to an embodiment of the present invention.

Hereinafter, the operation of a preferred embodiment of the present invention will be described with reference to the accompanying drawings. Like reference numerals designate like components in the drawings where possible even though components are shown in different drawings. In the following description of the present invention, a detailed description of related known functions or configurations will be omitted so as not to obscure the subject of the present invention. The terms which will be described below are terms defined in consideration of the functions in the present invention, and may be different according to users, intentions of the users, or customs. Therefore, the definition should be made based on the overall contents of the present specification.

A number of methods for reducing the power consumption of the wireless terminal have been proposed. For example, the components constituting the wireless terminal may operate by itself at a low power, or the wireless terminal may control the power of each component. Hereinafter, the wireless terminal of the present specification may include devices that can transmit and receive data through a connection with wireless networks (hereinafter, referred to as 'wireless communication'), and for an example, may include mobile terminals including a smart phone, and wireless devices and laptop computers, which support the access to the wireless network.

In the case of a smart phone that is a typical example of the wireless terminals, it has been confirmed that a significant amount of power is consumed for wireless communication-related operations. At this time, the wireless communication-related operations may include the packet transmission/reception for the background application installed in the terminal (for example, the upgrading of a version) even when the corresponding terminal is not used by that user, as well as the packet transmission/reception by the operation of the user. In addition, a chipset is embedded in the wireless terminal that supports the wireless communication. The chipset is maintained to be in the power-off state when it is not in use in order to reduce the power consumption of the wireless terminal instead of remaining in the power-on state all the time. That is, the chipset of the terminal operates in the power-on state when the data packet to be transmitted or received exists, and switches to the power-off state when the data packet to be transmitted or received does not exist for a specific period of time. Therefore, the amount of power consumption of the wireless terminal may vary depending on the time of generating the packets to be transmitted or received by the terminal.

Thus, methods for reducing the power consumption due to the wireless communication in the wireless terminal have been studied. For example, the methods may include a technique in which the terminal controls the distribution of the packets to be transmitted or received, and may include a technique in which the terminal estimates the distribution of the packets to be transmitted or received and controls the power-on/off state of the installed chipset according to the estimation. In order to carry out these techniques, information on the amount of power consumption during the transmission and reception of the packets in the terminal is required. More specifically, in the case where the terminal communicates with a cellular base station, information on the amount of power consumed in the cellular communication chip set of the terminal is required, and in the case where the terminal wirelessly communicates with an AP (Access Point), information on the amount of power consumed in the wireless communication chip set of the terminal is required. In addition, information on the amount of power consumed in other components of the terminal for processing the packets is required as well. Accordingly, studies on methods for measuring and analyzing the amount of power dissipated in each component of the terminal are in progress.

However, in the conventional method, an application layer of a server, which supports an application executed in the terminal, is not able to recognize specific conditions that are related to the operation in which each component or the chip set of the wireless terminal, which operates in relation to the wireless communication-related operation, enters a power save mode (PSM). The conditions may be different depending on the type of wireless terminal and the accessed AP. Therefore, it is difficult for the application layer of the server to predict the amount of power consumption of the terminal according to the characteristics of the wireless data traffic. Moreover, the method, in which the wireless terminal obtains information on its own power consumption, has not been proposed yet. Thus, the wireless communication-related operation for a specific application may be performed regardless of the wireless terminal state, thereby causing an unnecessary time delay for the operation and a waste of power of the wireless terminal. Therefore, hereinafter, the present invention provides a power control method and apparatus for reducing the power of the wireless terminal. According to this, the embodiment of the present invention models the power consumption of the wireless terminal in the wireless communication, which is a main factor for the power consumption of the wireless terminal. To this end, when the terminal is performing the wireless communication, the operation mode and the amount of power consumption of the terminal are required. To this end, the embodiment of the present invention estimates PSM-related parameters of the wireless terminal (hereinafter, referred to as 'PSM parameters') with the help of the application layer of the measuring server, and the wireless terminal estimates a power consumption pattern according to the estimated operation mode. In addition, based on the estimated operation mode and power consumption pattern of the wireless terminal, the conditions for reducing the power consumption to a desired level may be set, and a clustering condition may be determined based on the same. Afterwards, the application layer of the server and the wireless terminal may perform the wireless communication to correspond to the set clustering condition in order to thereby reduce the dissipated power in the wireless terminal. Here, the PSM parameters, for example, may contain an inactivation timer and a wake-up cycle. Hereinafter, in the present invention, the PSM parameters will be described to contain the inactivation timer and the wake-up cycle for the convenience of explanation, but the PSM parameters are not limited thereto.

First, the driving time of the inactivation timer refers to a predetermined time to wait for the packet reception that may occur before entering the PSM from the time when the wireless terminal in the active mode receives the last packet. In addition, a period in which the terminal periodically wakes up in order to receive paging signals that are transmitted from the base station of the cellular communication or beacons that are transmitted from the WiFi-based AP (hereinafter, referred to as a 'paging/beacon reception period'), in general, has a wake-up cycle corresponding to a constant cycle that is referred to as a listen interval or a paging interval. The wireless communication chip set of the wireless terminal remains in the power-on state in the inactivation timer and in the paging/beacon reception period. In addition, the chip set is maintained to be in the power-off state when the wireless terminal operates in the PSM and during the wake-up cycle.

Hereinafter, the embodiment of the present invention proposes a method in which the server, which supports the application of the terminal, measures the inactivation timer and the wake-up cycle. Accordingly, even when the terminal or the server cannot recognize the information on the wireless communication chip set mounted on the terminal, the PSM parameters may be obtained. In addition, the obtained PSM parameters may be utilized for the power consumption modeling or a database (DB) in the server.

Meanwhile, even though the wireless communication-related packets are transmitted and received at the same yield for a specific period of time, if the distribution of the transmission/reception intervals between the packets is different, the amount of power consumption of the corresponding terminal may vary. That is, the power pattern consumed in the wireless communication of the wireless terminal cannot be accurately analyzed only by the yield of the packets transmitted and received by the terminal. Therefore, the embodiment of the present invention utilizes the distribution of the transmission/reception intervals of the wireless communication-related packets in order to more accurately model the amount of power consumption for the wireless terminal that is performing the wireless communication.

Meanwhile, the embodiment of the present invention provides a method in which a transmission server or a proxy server, which can make a traffic control related to the wireless communication, detects the PSM parameters according to the type of wireless terminal and the type of wireless network, and controls the traffic of the corresponding server by using the detected PSM parameters. In addition, the wireless terminal, according to the embodiment of the present invention, may: model a power consumption pattern of the terminal depending on the interval of the packets transmitted to, or received from, the base station; estimate the amount of power consumption by using the same; and calculate, as a condition for determining the clustering cycle, the required amount of power saving or the required amount of additional delay time that is desired to be obtained. In addition, the wireless terminal reports on the required amount of power saving or the required amount of additional delay time that has been calculated, to the server. Then, the server sets the clustering cycle to correspond to the required amount of power saving or the required amount of additional delay time that is requested by the terminal, and performs the traffic control according thereto. Meanwhile, in the embodiment of the present invention, the power consumption of the wireless terminal may be reduced by clustering the packets to be transmitted to the wireless terminal and transmitting the same at once to correspond to the clustering cycle. With such a characteristic, the embodiment of the present invention may be applied to services that are less sensitive to a time delay in which the packet transmission time from the server is delayed through the wireless communication. Such services, for example, may include FTP (File Transfer Protocol) transmission, an E-mail push service, or the background traffic and update of the application.

In summary, the method for reducing the power consumption of the wireless terminal, according to the embodiment of the present invention, may be comprised of four processes.

In the first process, the wireless terminal transmits a triggering packet that makes a request for measuring the PSM parameters to the server that supports the application through the application layer. Next, the server, which has received the triggering packet, estimates the driving time of the inactivation timer of the wireless terminal through the interaction with the wireless terminal.

In the second process, the application layer of the server estimates the wake-up cycle of the wireless terminal.

In the third process, the wireless terminal models the power consumption pattern in the wireless communication by using the PSM parameters that are estimated by the server. At this time, the amount of power consumption of the terminal includes the power consumption of the components for processing the wireless communication-related packets, as well as the power consumption of the wireless communication chip set of the wireless terminal. In addition, the terminal calculates the required amount of power saving or the required amount of additional delay time, which is desired to be obtained, based on the modeling result, and transmits the same to the server.

In the fourth process, the server sets a clustering cycle that satisfies the required amount of power saving or the required amount of additional delay time, which has been obtained from the terminal. In addition, the server buffers the packets to be transmitted to the wireless terminal, which are generated during the clustering cycle, and transmits the packets, which have been clustered through the buffering, to the wireless terminal in the corresponding cycle.

FIG. 1 illustrates an example of a system configuration, according to an embodiment of the present invention.

For example, FIG. 1 shows: a base station 100 that provides the mobile communication in a typical cellular network; an AP 105 that has smaller service coverage than the service coverage of the base station 100, and provides the mobile communication in the service coverage; and a mobile terminal 110 and a wireless terminal 115, which can access the base station 100 and the AP 105, respectively. In addition, the system includes an application server 120 that transmits or receives data related to the application to or from the wireless terminals, such as the mobile terminal 110 or the wireless terminal 115, which have a specific installed application supported by the application server 120, through the base station 100 or the AP 105. In addition, the application server 125 is provided with a DB 125 that stores authentication and security information of the users in relation to the application. Furthermore, the system includes a proxy server 130 that performs the same operation as a common proxy server. Here, the application server 125 or the proxy server 130, according to the embodiment of the present invention, operates as a measuring server 300 of FIG. 3, and when the triggering packet, which makes a request for measuring the PSM parameters for the reduction in the power consumption of the terminal, is received, the application server 125 or the proxy server 130 estimates the PSM parameters through the interaction with the terminal, according to the embodiment of the present invention. In addition, the application server 125 or the proxy server 130 stores, or pre-stores, the PSM parameters, which are estimated according to the present invention, for each wireless terminal in its own DB 125 or 135. The case where the PSM parameters are pre-stored means that the registration of the PSM parameters has been completed, according to the embodiment of the present invention. Alternatively, according to another embodiment, the PSM parameters may be registered to be mapped with the type of wireless terminal by the service provider.

Figure 2:
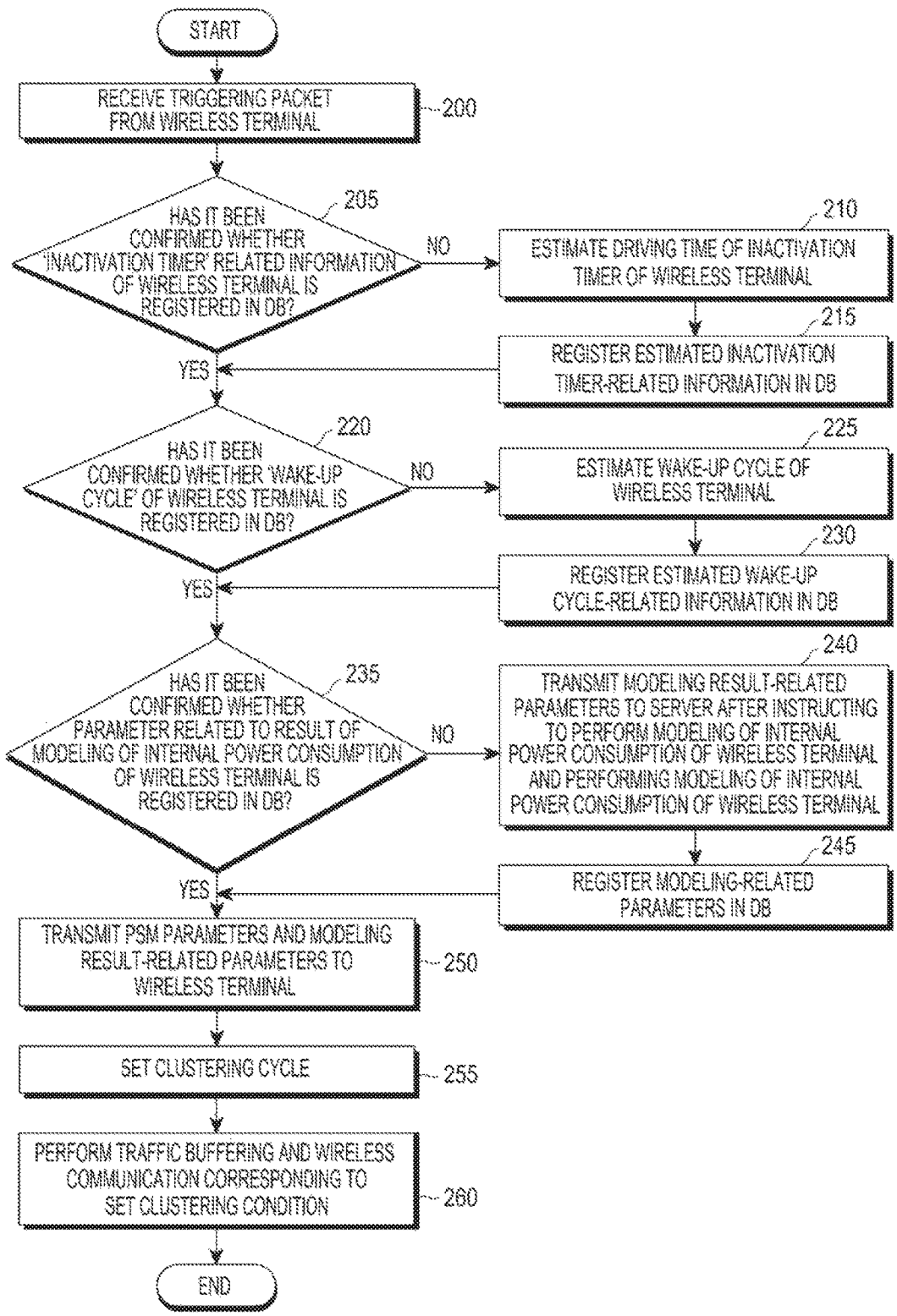
FIG. 2 is a flowchart illustrating the overall operation of controlling the power of the wireless terminal, according to an embodiment of the present invention.

FIG. 2 is a flowchart showing the overall operation of controlling the power of the wireless terminal, according to an embodiment of the present invention. Here, the measuring server may be the application server 120 or the proxy server 130 of FIG. 1.

Referring to FIG. 2, operations 200 to 215 correspond to the first process described above. In operation 200, the measuring server receives a 'triggering packet for estimating the PSM parameters' from a certain wireless terminal. Then, in operation 205, the measuring server may check whether or not 'inactivation timer'-related information of the wireless terminal is registered in its own DB. As a result of the check, if the 'inactivation timer'-related information of the wireless terminal is not registered in the DB, the measuring server estimates the driving time of the inactivation timer of the wireless terminal in operation 210. The operation of estimating the driving time of the inactivation timer will be described in detail with reference to FIG. 3a later. Next, in operation 215, the measuring server registers the estimated inactivation timer-related information for the wireless terminal in the DB, and proceeds to operation 220.

Next, operations 220 to 230 correspond to the second process described above. Meanwhile, if the 'inactivation timer'-related information of the wireless terminal is registered in the DB, the measuring server may check whether or not a 'wake-up cycle' of the wireless terminal is registered in the DB in operation 220. As a result of the check, if the 'wake-up cycle' of the wireless terminal is not registered in the DB, the measuring server proceeds to operation 225. In operation 225, the measuring server estimates the wake-up cycle of the wireless terminal. The operation of estimating the wake-up cycle will be described in detail with reference to FIG. 3b later. Then, in operation 230, the measuring server registers the estimated wake-up cycle for the wireless terminal in the DB, and then proceeds to operation 235.

Next, operations 235 to 245 correspond to the third process described above. Meanwhile, in operation 235, the measuring server checks whether or not parameters related to the modeling result of the power consumption of the wireless terminal are registered in the DB. As a result of the check, if the modeling result-related parameters of the wireless terminal are not registered in the DB, the measuring server proceeds to operation 240. In operation 240, the measuring server transmits, to the wireless terminal, a command that instructs the terminal to perform the modeling for the amount of power consumption. According to this, the wireless terminal performs the modeling for the amount of power consumption, and calculates the required amount of power saving or the required amount of additional delay time, which is desired to be obtained, based on the modeling result, to then be transmitted to the server. The detailed operation of modeling the amount of power consumption will be described below. In addition, in operation 245, the measuring server registers the modeling result-related parameters received from the wireless terminal in the DB, and then proceeds to operation 250.

Finally, operations 250 to 260 correspond to the fourth process described above. Meanwhile, if the modeling result-related parameters of the wireless terminal are not registered in the DB, the measuring server proceeds to operation 250. In operation 250, the measuring server transmits the PSM parameters and the modeling result-related parameters to the wireless terminal at once. However, according to another embodiment, if the PSM parameters or the modeling result are estimated in each operation, the estimated information may be directly transmitted to the wireless terminal.

Then, in operation 255, the measuring server sets a clustering cycle that satisfies the modeling result-related parameters. In addition, in operation 260, the measuring server performs the wireless communication corresponding to the set clustering cycle with the wireless terminal. The operation of setting the clustering cycle will also be described in detail below.

Figure 3A:
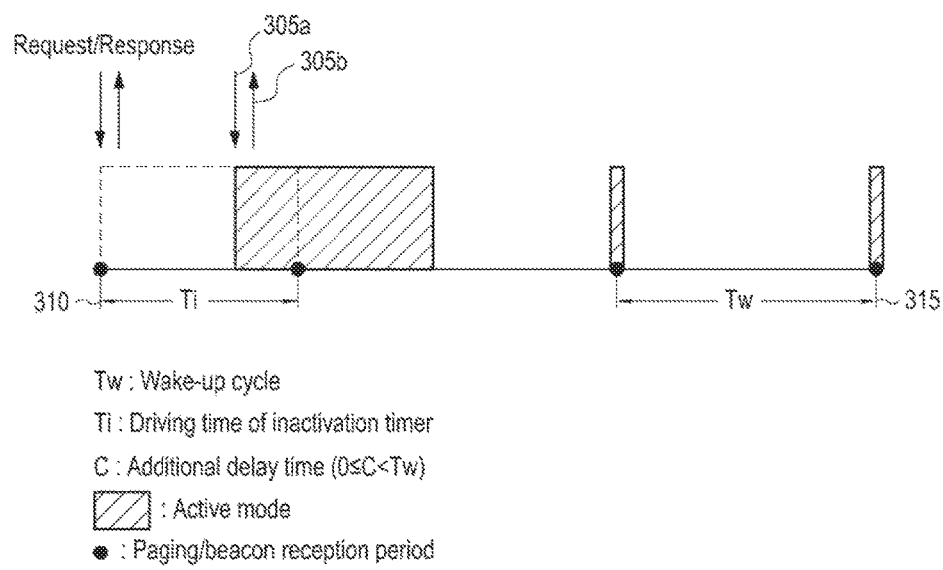
FIG. 3a to FIG. 3c illustrate the operation of the wireless terminal according to the relationship between a driving cycle of an inactivation timer and a transmission cycle of a UDP packet, according to an embodiment of the present invention.
Figure 3B:
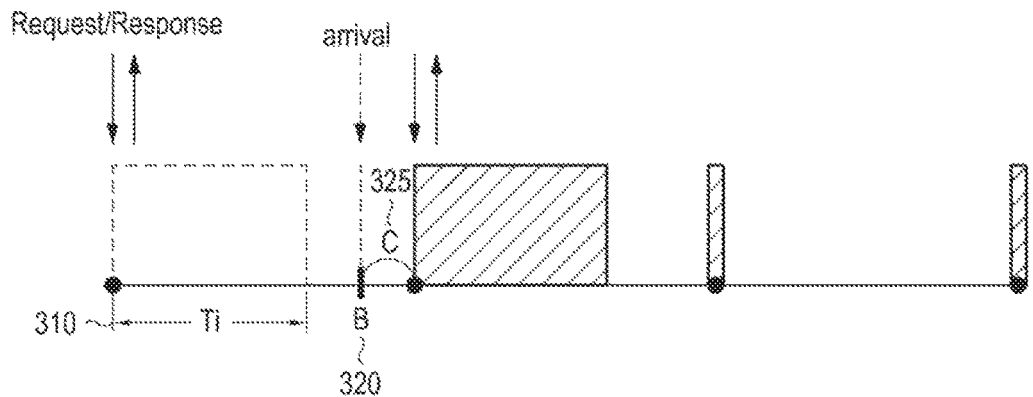
Figure 3C:
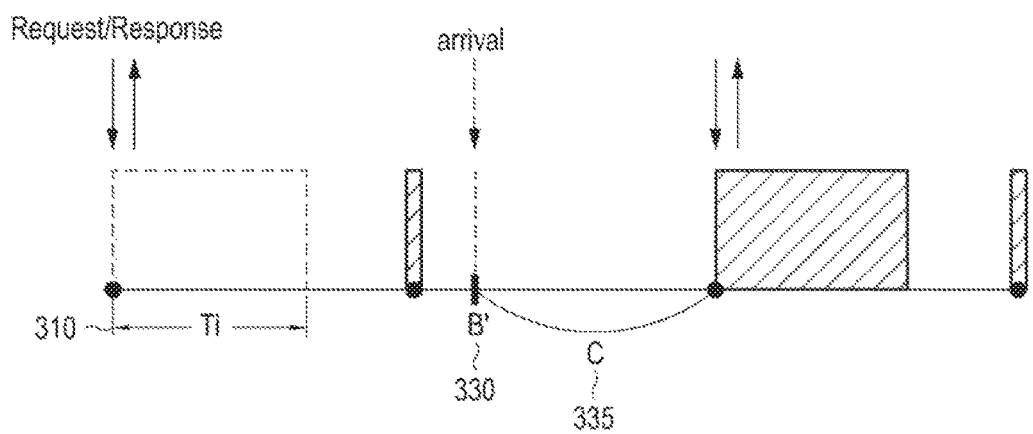

FIG. 3a to FIG. 3c illustrate the operation of the wireless terminal according to the relationship between the driving cycle of the inactivation timer and a transmission cycle of a UDP packet, according to an embodiment of the present invention. The x-axis in FIG. 3a to FIG. 3c represents time. In addition, the wireless communication chip set remains in the power-on state within the driving time (Ti) 310 of the inactivation timer after the packet transmission/reception time 310. In addition, the operation mode of the wireless terminal also corresponds to the active state during the time corresponding to the hatched rectangular block, and the wireless communication chip set remains in the power-on state. When the chip set is in the power-on state, if the wireless terminal receives an UDP packet transmitted from the measuring server, the wireless terminal may transmit, to the measuring server, a response thereto. However, when the wireless terminal enters the PSM, since the chip set is in the power-off state, the AP or the base station, which receives the packet transmitted from the measuring server, may not transfer the packet to the wireless terminal at the corresponding time. Accordingly, the AP or the base station stores the packet in the buffer, and thereafter, transmits a beacon or paging signal together with indication information indicating that there is a packet to be transmitted at the time when the beacon or paging signal is transmitted. For example, if a transmission packet occurs while the wireless terminal operates in the PSM as the time (B) 320 of FIG. 3b, the AP or the base station transmits the beacon or paging signal together with the indication information in the upcoming paging/beacon reception period. The mark ● in FIG. 3a to FIG. 3c shows a paging/beacon reception period in which the wireless terminal, which operates in the PSM, periodically wakes up in order to receive the beacon or paging signal of the AP or base station. The paging/beacon reception period has a constant cycle, and the cycle corresponds to the wake-up cycle described above. For example, the cycle corresponds to Tw 315 of FIG. 3a. The wake-up cycle is a value related to the parameter setting values of the access network.

Afterwards, when the wireless terminal obtains the indication information after turning on the chip set in the paging/beacon reception period, the wireless terminal enters the active mode in order to thereby receive the packet that is stored in the buffer of the AP or base station. FIG. 3a shows an example in which the terminal responds in the case where the time interval of the UDP packets transmitted by the measuring server is shorter than the driving time 310 of the inactivation timer of the wireless terminal. In this case, as shown in FIG. 3a, the wireless terminal receives a new packet (305a) and transmits a response (305b) in the time period in which the upcoming inactivation timer is driven after the paging/beacon reception period. Therefore, through the reception and transmission of the new packet (305a and 305b), the driving time 310 of the inactivation timer may be newly updated at the time when the new packet is received. That is, in the case where the time interval of the UDP packets transmitted by the measuring server is shorter than the driving time of the inactivation timer of the wireless terminal, the wireless terminal is not able to enter the PSM and continues to remain in the active state. In this case, an RTT value for the UDP packet, which is measured in the measuring server, may include: a transmission delay, which is the difference between the time when the measuring server transmits the UDP packet and the time when the measuring server receives a response thereto; and a propagation delay from the measuring server to the wireless terminal and from the wireless terminal to the measuring server, wherein these time delays do not have large enough values to cause a trouble.

FIG. 3b to GUTI 3c show an example in which the terminal responds in the case where the time interval of the UDP packets transmitted by the measuring server is longer than the driving time 310 of the inactivation timer of the wireless terminal. Here, provided that the wireless terminal maintains the initial power-on state of the chip set, the wireless terminal may immediately respond to the UDP packet transmitted from the measuring server. However, when the driving time of the inactivation timer of the wireless terminal expires, the chip set of the wireless terminal is in the power-off state, so the wireless terminal may not respond to the UDP packet transmitted from the measuring server. Referring to FIG. 3b, the wireless terminal obtains the indication information described above in the paging/beacon reception period at the time (C) 325, and then recognizes the existence of the packet, which has occurred at the time (B) 320 and has been stored in the buffer of the AP or the base station, in order to thereby enter the active mode. In addition, the wireless terminal receives the packet stored in the AP or base station, which has been generated at the time (B) 320. In this case, a delay time between the time (B) 320 when the measuring server transmits the UDP packet and the paging/beacon reception period in which the wireless terminal receives the indication information {hereinafter, referred to as an 'additional delay time,' (C) 325} occurs. The additional delay time does not occur when the time interval of the UDP packets transmitted to the wireless terminal by the measuring server is shorter than the driving time of the inactivation timer of the wireless terminal. In comparison to this, FIG. 3c shows an example in which the additional delay time (C) 335 from the time (B) 330 when the UDP packet, which is to be transmitted to the wireless terminal operating in the PSM mode, is generated to the paging/beacon reception period is longer than the case of FIG. 4a. Since the additional delay time cannot exceed the wake-up cycle of the wireless terminal, it varies in the range of 0 to the wake-up cycle.

Therefore, it is assumed that the measuring server, according to the embodiment of the present invention, estimates the driving time 310 of the inactivation timer while reducing the time cycle of the UDP packets to be transmitted in the case of FIG. 3a. Then, in order to estimate the wake-up cycle, the measuring server adjusts the time interval of UDP packets to be longer than the driving time of the inactivation timer as shown in FIG. 3b and FIG. 3c, and then transmits the same.

As shown in FIG. 3a, if the time interval of the UDP packets that are transmitted by the measuring server is less than the driving time of the inactivation timer (for example, 200 ms), the additional delay time is not contained in the RTT value. On the contrary, if the time interval of the UDP packets is set to be a certain value longer than the inactivation timer, and then if the UDP packet is transmitted to the wireless terminal, the RTT value of the UDP packet varies in the range of 0 to the wake-up cycle. Therefore, in the embodiment of the present invention as described above, a predetermined number of UDP packets are transmitted at a time interval that is set to be a certain value longer than the driving time of the inactivation timer, and the RTT values for the same are accumulated in order to thereby obtain an average value thereof. Then, a result value obtained through the subtraction of the RTT averages for the UDP packets that are transmitted at a time interval within the driving time of the inactivation timer, which does not contain the additional delay time, stochastically correspond to half the value of the wake-up cycle of the corresponding terminal. Therefore, in the embodiment of the present invention, the wake-up cycle of the terminal may be estimated by taking double the result value. The marks ○ 515 of FIG. 5b below represent moving average values of the measured RTTs. Since the wake-up cycle of the general wireless terminal is a multiple of the transmission cycle of the paging signal or beacon signal transmitted from the AP or base station, the wake-up cycle may be estimated by taking a value most closely approximating to double the result value from among the elements of the group {transmission cycle of paging signal/beacon of base station*i, wherein i refers to a natural number}.

Figure 4A:
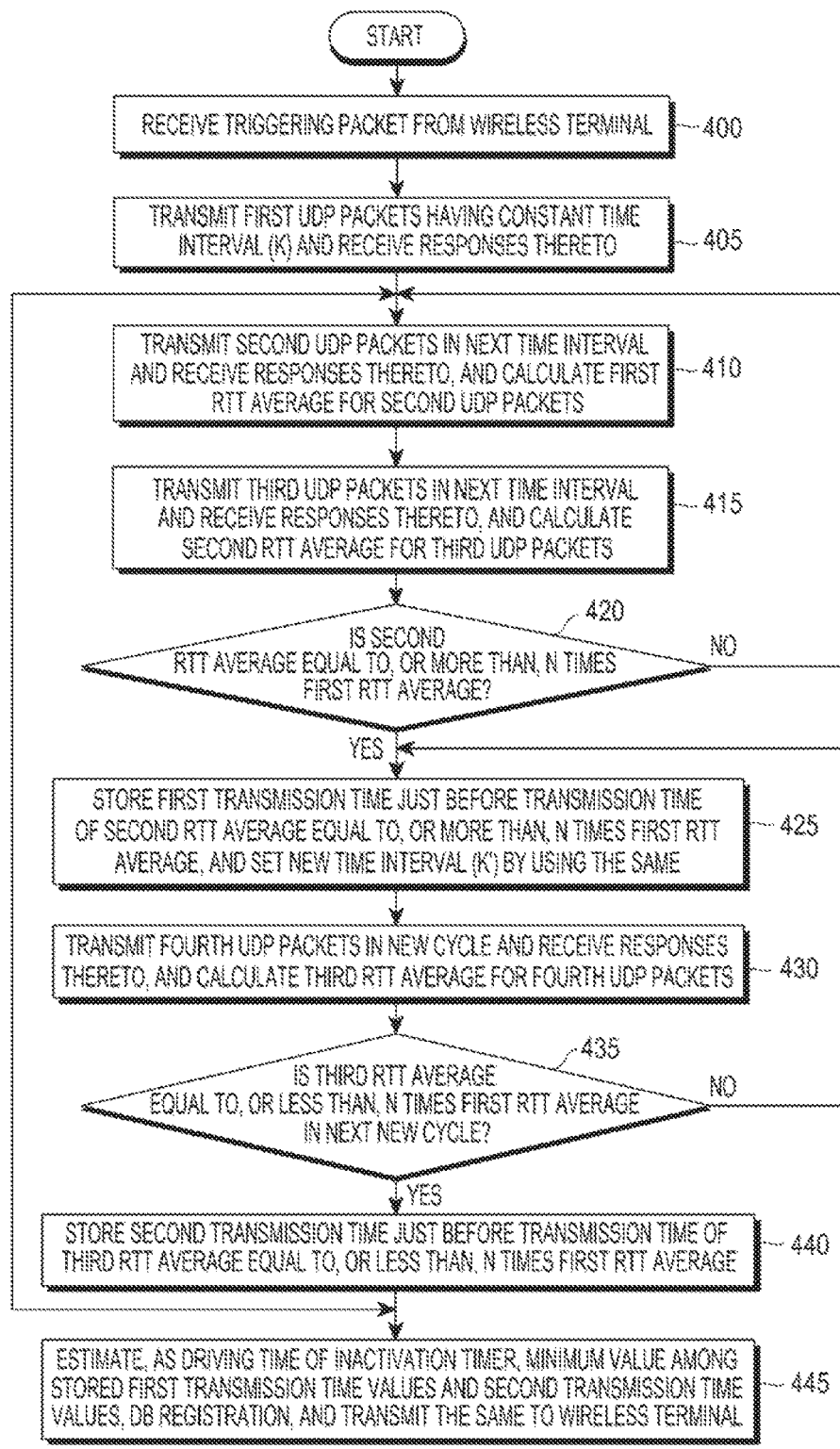
FIG. 4a is a flowchart illustrating the operation of estimating the driving time of the inactivation timer of the wireless terminal, according to an embodiment of the present invention.

FIG. 4a is a flowchart illustrating the operation of estimating the driving time of the inactivation timer of the wireless terminal, according to an embodiment of the present invention. Here, the wireless terminal, which is a target for the measurement of the PSM parameters, may be the mobile terminal 110 or the wireless terminal 115 of FIG. 1 as described above. In addition, the measuring server may be the application server 120 or the proxy server 135 of FIG. 1. It is assumed that the wireless terminal is the wireless terminal 115 that accesses the measuring server through the AP 105 of FIG. 1, for the convenience of explanation.

Referring to FIG. 4a, in operation 400, the measuring server receives a triggering packet that makes a request for measuring the PSM parameters, which is transmitted from the wireless terminal.

The measuring server, which has received the triggering packet, transmits a predetermined number (two or more) of first UDP (User Datagram Protocol) packets to the wireless terminal in a constant cycle, and receives responses to the first UDP packets from the wireless terminal in operation 405. Here, since the UDP packet is not re-transmitted, two or more UDP packets are transmitted in case the terminal fails to receive the same. For the convenience of explanation, it is assumed that the time interval at which the measuring server transmits the UDP packets is kms (for example, k=10 ms). Likewise, after transmitting the first UDP packets, in operation 410, the measuring server transmits a predetermined number (two or more) of second UDP packets to the wireless terminal at the next time interval, i.e., at the time of 2 kms, and receives responses to the second UDP packets from the wireless terminal. After that, the measuring server calculates the average {i.e., the first RTT (round trip time) average} of differences between the transmission time of the second UDP packets and the response reception time. Here, the transmission of the first UDP packet is intended to check the response state with respect to the wireless terminal prior to the measurement of the PSM parameters, so it is not used for the RTT calculation for estimating the inactivation timer.

After that, after transmitting the second UDP packets in operation 415, the measuring server transmits a predetermined number (two or more) of third UDP packets to the wireless terminal at the next time interval, i.e., at the time of 3 kms, and receives responses to the third UDP packets from the wireless terminal. Likewise, the measuring server calculates the second RTT average for the third UDP packets.

Figure 5A:
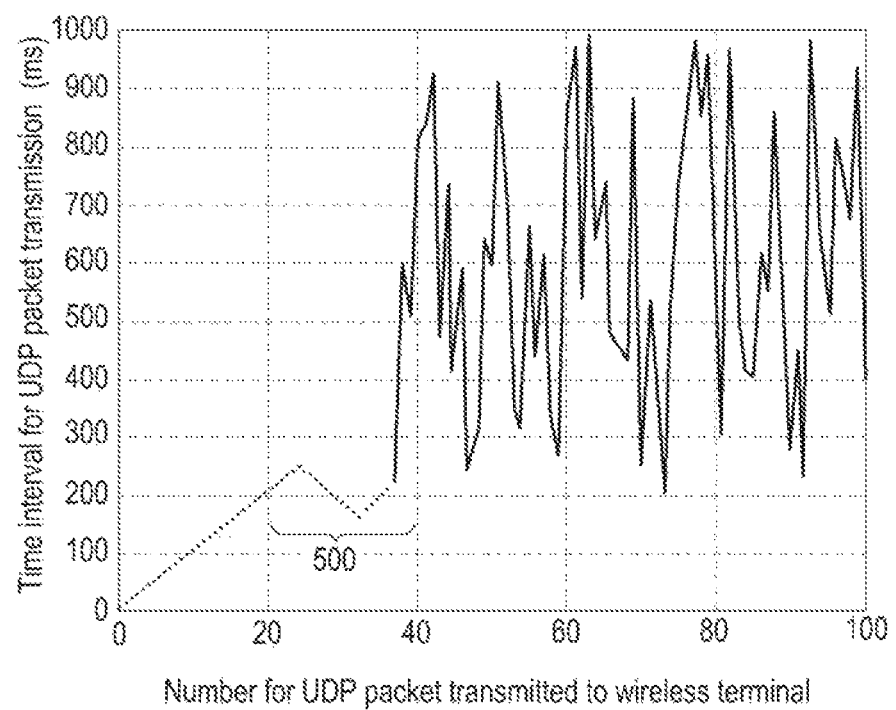
FIG. 5a is a graph showing an example of the distribution of a time interval with respect to the UDP packet transmission depending on the number for the UDP packet that is transmitted to the wireless terminal, according to an embodiment of the present invention.
Figure 5B:
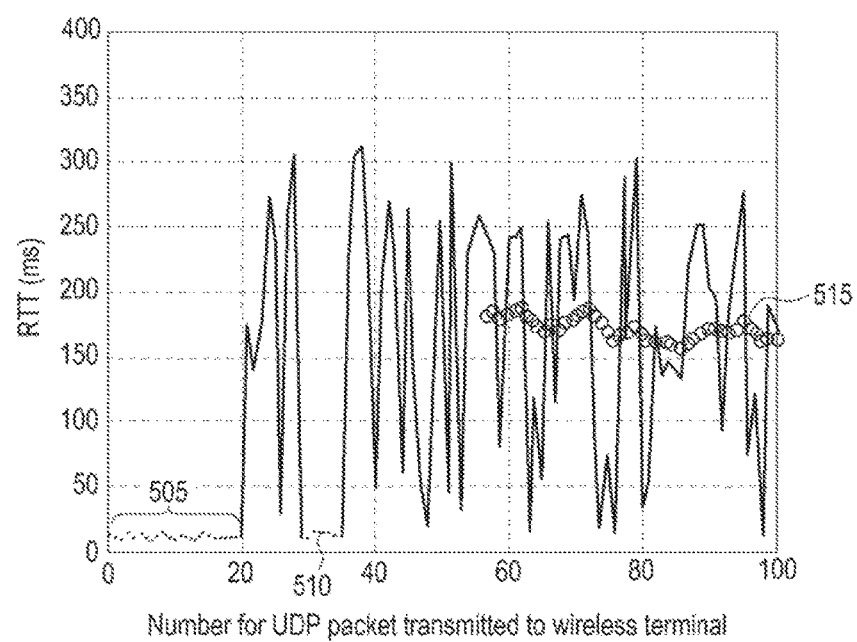

FIG. 5a is a graph showing an example of the distribution of a time interval with respect to the UDP packet transmission depending on the number for the UDP packet that is transmitted to the wireless terminal, according to an embodiment of the present invention. FIG. 5b is a graph showing an example of the distribution of an RTT that is measured for each of the UDP packets transmitted to correspond to FIG. 5a. Referring to FIG. 5b, it can be seen that the measured RTT is maintained to be almost the same value up to 20 UDP packets, and the RTT significantly varies for the UDP packets that are transmitted after that. The graph shows a characteristic in which the RTT has relatively small values and the RTT values are evenly distributed because the RTT for the UDP packets, which are transmitted at the time when the time interval of the transmitted UDP packets is less than the inactivation timer, does not contain the additional delay time as described above. Accordingly, the time interval (it corresponds to 200 ms in FIG. 5a), in which 20 UDP packets are transmitted and which shows the aforementioned characteristic through the RTT distribution of FIG. 5b, may be estimated as a value that is close to the inactivation timer. In addition, referring to FIG. 5a, when the UDP packets are transmitted at a greater time interval than 200 ms, it may be confirmed that the RTT of the UDP packet varies significantly. Therefore, in the embodiment of the present invention, the driving time of the inactivation timer may be estimated by using the characteristics of the RTT, which varies from the time corresponding to the inactivation timer. That is, in the embodiment of the present invention, in order to identify the time interval that is close to the driving time of the inactivation timer, for example, the measuring server verifies whether or not the second RTT average for the third UDP packets is equal to, or more than, n times (n is an integer more than 2) the first RTT average for the second UDP packets (n*first RTT average≤second RTT average) in operation 420. As a result of the verification, if the second RTT average is less than n times the first RTT average, the measuring server periodically repeats the transmission of the UDP packets and the reception of the responses, and calculates and compare the RTT averages thereof as operation 410 to operation 420 until the second RTT average becomes equal to, or more than, n times the first RTT average.

As a result of the verification, if the second RTT average is equal to, or more than, n times the first RTT average, it means that the RTT has significantly varied as in the case where the number of transmitted UDP packets exceeds 20 in FIG. 5b. Therefore, it may be confirmed that it corresponds to the time approximating to the driving time of the inactivation timer corresponding to the reference numeral 500 of FIG. 5a and the reference numeral 505 of FIG. 5b. In addition, referring to FIG. 5a, with regard to the time interval 500 for about 20 UDP packets (i.e., the 20th to 40th UDP packets) that are transmitted after the time of 200 ms that is estimated to be the driving time of the inactivation timer, in the period of the time interval more than 200 ms, the RTTs of FIG. 5b corresponding thereto vary significantly, and the RTTs 505 for the transmission of the UDP packets at the time interval close to 200 ms show the same distribution as the RTTs 510 for the time interval included in the driving time of the inactivation timer. Therefore, if it is identified that the second RTT average is equal to, or more than, n times the first RTT average as a result of the verification in operation 420, the driving time of the inactivation timer may be more accurately estimated through a time interval adjustment operation in operation 425 to operation 435. That is, in operation 425, the measuring server stores the first transmission time (2 kms) just before the transmission time (3 kms) of the second RTT average that is equal to, or more than, n times the first RTT average. In addition, a new time interval (k') is configured by subtracting the first transmission time from the time interval (kms).

In addition, in operation 430, the measuring server transmits, to the wireless terminal, a predetermined number (two or more) of fourth UDP packets at the new time interval, and receives responses thereto from the wireless terminal. Then, the measuring server calculates the third RTT average for the fourth UDP packets. In addition, in operation 435, the measuring server checks whether or not the third RTT average is equal to, or less than, n times the first RTT average. If the third RTT average is not equal to, or less than, n times the first RTT average as a result of the check, the measuring server repeats operation 430 and operation 435.

If the third RTT average is equal to, or less than, n times the first RTT average as a result of the check, the measuring server stores the second transmission time just before the transmission time of the third RTT average that is equal to, or less than, n times the first RTT average in operation 440, and in order to improve the accuracy of an estimated value for the driving time of the inactivation timer, the measuring server repeats operation 410 to operation 440 a predetermined number of times (m) (m is an integer more than 2).

In addition, in operation 445, the measuring server estimates, as the driving time of the inactivation timer, a minimum value among the first transmission time values and the second transmission time values, which are stored by repeating the operation m times. After that, the measuring server registers the minimum value, as the driving time of the inactivation timer of the wireless terminal, in its own DB, and transmits the same to the wireless terminal. Alternatively, according to another embodiment, after all of the PSM parameters of the wireless terminal and the modeling result for the reduction in the power consumption are registered, the measuring server may transfer, to the terminal, the driving time of the inactivation timer together with other information.

Figure 4B:
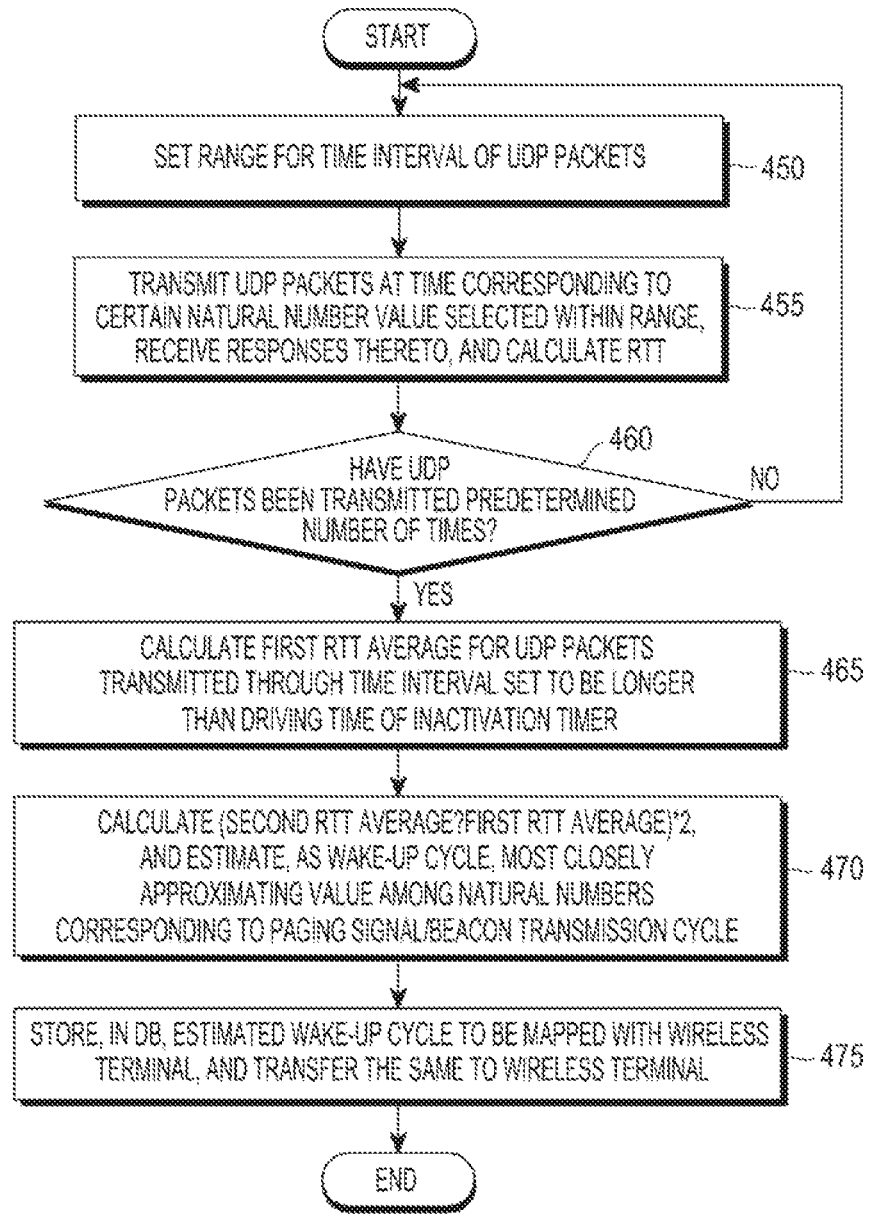
FIG. 4b is a flowchart illustrating the operation of estimating a wake-up cycle of the wireless terminal, according to an embodiment of the present invention.

FIG. 4b is a flowchart illustrating the operation of estimating the wake-up cycle of the wireless terminal, according to an embodiment of the present invention. Here, the description of FIG. 4a may be applied to the operation performed to estimate the wake-up cycle of the wireless terminal in the same manner. In addition, FIG. 4b shows the operation performed after the measuring server obtains the driving time of the inactivation timer of the wireless terminal.

Referring to FIG. 4b, in operation 450, the measuring server sets an available range for the time interval of UDP packets from the driving time of the inactivation timer of the wireless terminal, which is registered in the DB or is estimated through the operations of FIG. 4a, to a certain long time interval (for example, it may be set to be 2 seconds for the WiFi scheme).

In operation 455, the measuring server randomly selects a natural number value within the range set above, and sets, as the transmission cycle of the next UDP packet, the time corresponding to the selected natural number value. After that, the measuring server transmits a predetermined number (two or more) of UDP packets to the wireless terminal, and receives the responses in order to thereby calculate the RTT. In addition, the measuring server checks whether or not the UDP packets have been transmitted a predetermined number of times in operation 460. If the UDP packets have not yet been transmitted a predetermined number of times as a result of the check, the measuring server repeats operation 450 to operation 455 a predetermined number of times.

If the UDP packets have been transmitted the predetermined number of times as a result of the check, the measuring server calculates the first RTT average of the measured RTT values in operation 465. The first RTT average is for the UDP packets that are transmitted and received through the time interval that is set to be longer than the driving time of the inactivation timer. As a specific example, it corresponds to the portion 515 shown in FIG. 5b, and may have a value of approximately 175 ms.

In addition, in operation 470, the measuring server calculates a candidate value of the wake-up cycle by subtracting the first RTT average from the second RTT average (it corresponds to the reference numeral 505 in FIG. 5b, and may have a value of about 25 ms), which is measured within the time interval estimated to be the driving time of the inactivation timer, and doubling the subtracted value. In addition, the measuring server estimates, as the wake-up cycle, a value most closely approximating the candidate value from among the natural numbers of a group {cycle of paging/beacon signal of base station*i, wherein i refers to a natural number} corresponding to the transmission cycle of the paging signal transmitted from the base station or the transmission cycle of the beacon. After that, in operation 475, the measuring server stores, in the DB, the estimated wake-up cycle to be mapped with the wireless terminal, and transfers the same to the wireless terminal. Like the estimated driving time of the inactivation timer described above, the estimated wake-up cycle may be transmitted to the wireless terminal together with other information after all of the PSM parameters of the wireless terminal and the modeling result for the reduction in the power consumption are registered, according to another embodiment.

Figure 6A:
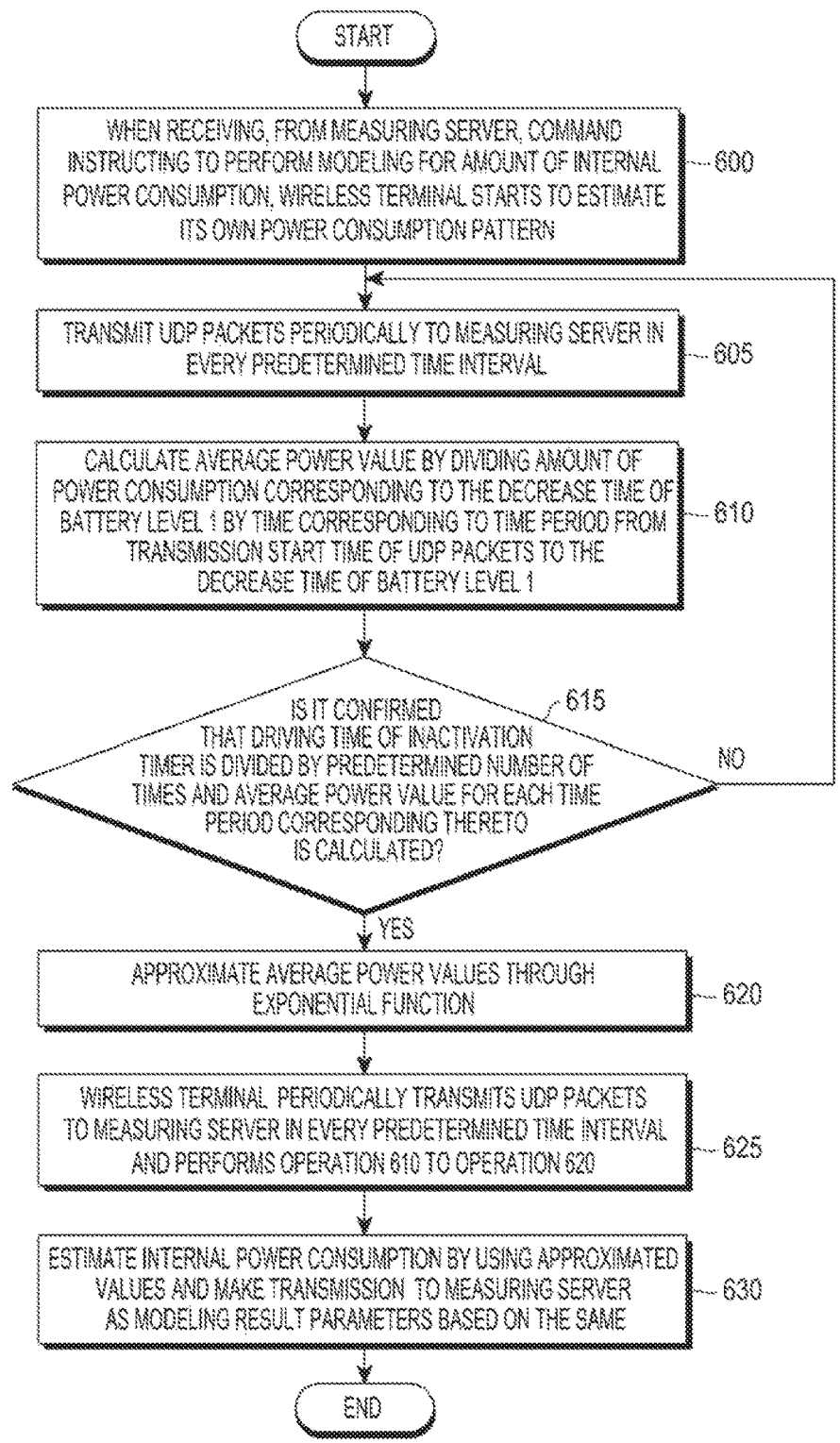
FIG. 6a is a flowchart illustrating the operation of estimating a power consumption pattern of the wireless terminal, according to an embodiment of the present invention.

FIG. 6a is a flowchart illustrating the operation of estimating a power consumption pattern of the wireless terminal, according to an embodiment of the present invention.

Figure 6B:
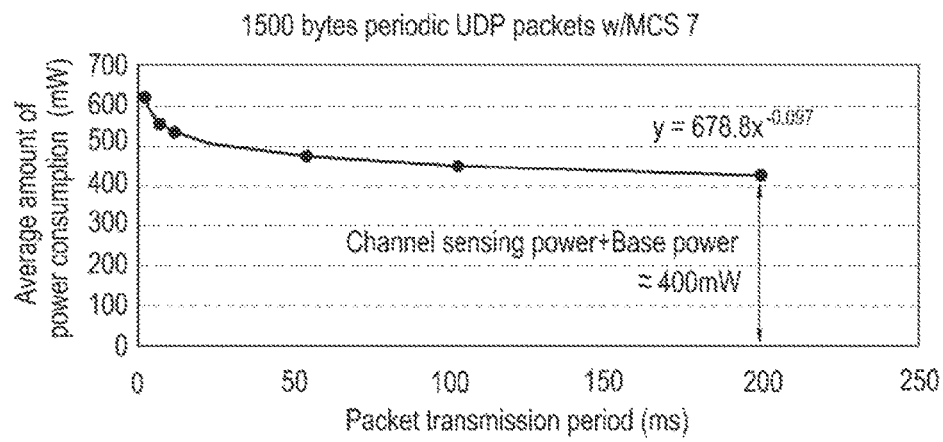
FIG. 6b illustrates an example of a result of the estimated power consumption pattern of the wireless terminal, according to an embodiment of the present invention.
Figure 6C:
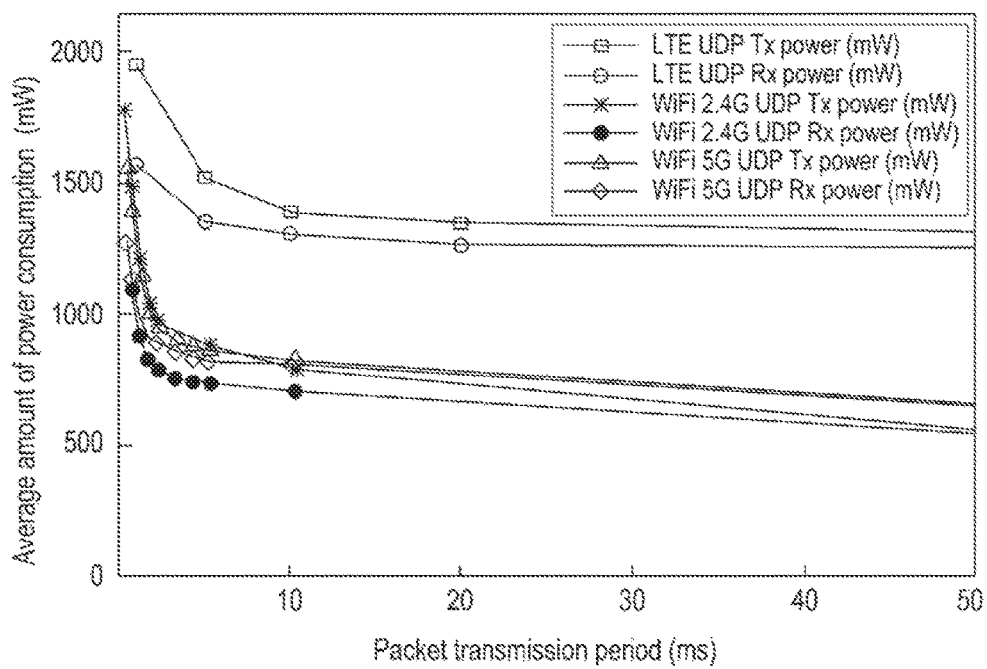
FIG. 6c illustrates a graph showing an example of the power consumption pattern for the UDP transmission and reception in the LTE scheme and the Wifi scheme.
Figure 6D:
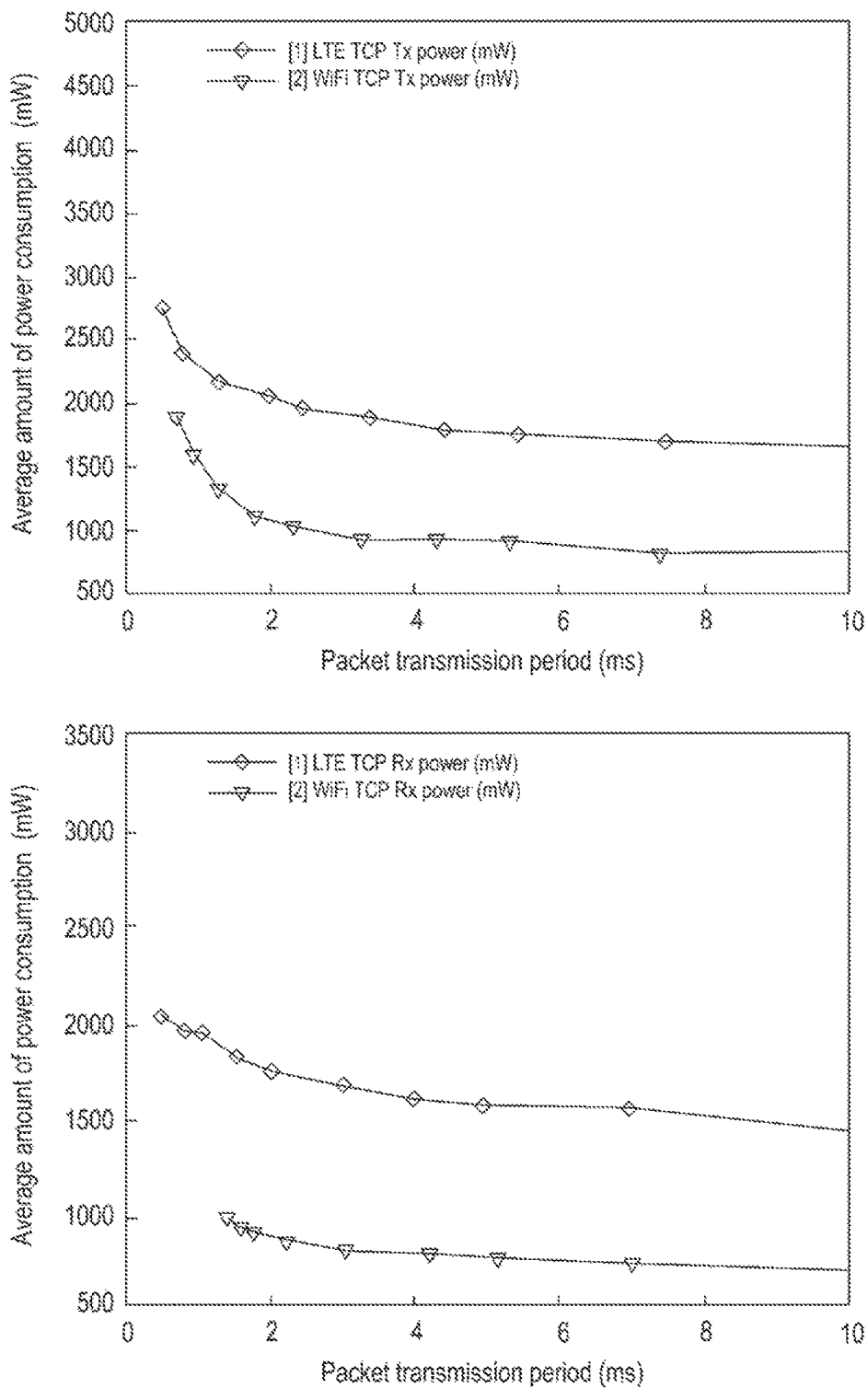
FIG. 6d illustrates a graph showing an example of the power pattern for the TCP transmission and reception of the LTE scheme and the Wifi scheme.

Referring to FIG. 6a, when the wireless terminal receives, from the measuring server, a command instructing to perform the modeling for the amount of power consumption, the wireless terminal performs an operation to estimate its own power consumption pattern by using its own inactivation timer driving time that has been obtained from the measuring server in operation 600. Here, the driving time of the inactivation timer may be registered in the DB of the server through the operations described in FIG. 4a, or may be pre-registered by the service provider. For example, it is assumed that the inactivation timer is applied to the WiFi. More specifically, the wireless terminal periodically transmits, for example, the UDP packets to the measuring server in every predetermined time interval (for example, 2 ms) in operation 605. Here, according to another example, the transmission of the UDP packet may be extended to the transmission/reception of a TCP (Transmission Control Protocol). Also, the transmission/reception power of LTE (Long Term Evolution) may be estimated in the same manner. According to this, FIG. 6c is a graph showing an example of the power consumption pattern for the UDP transmission and reception in the LTE scheme and the WiFi scheme. In addition, FIG. 6d illustrates a graph showing an example of the power pattern for the TCP transmission and reception in the LTE scheme and the Wifi scheme. Both FIG. 6c and FIG. 6d show that the power consumption decreases as the packet transmission period increases.

Next, in operation 610, the application layer of the wireless terminal measures the battery level of the wireless terminal in order to thereby measure the time for which the battery level decreases to a predetermined minimum unit of variation (hereinafter, referred to as a 'minimum unit decrease time'). In addition, an average power value is calculated by dividing the amount of power consumption corresponding to the minimum unit decrease time by the time corresponding to the period from the transmission start time of the UDP packets to the minimum unit decrease time. In addition, in operation 615, the wireless terminal divides the driving time of the inactivation timer by a predetermined number of times, and checks whether or not average power values are calculated for all of the time periods corresponding to the predetermined number of times. As a result of the check, if the average power values are not calculated for all of the time periods, the wireless terminal repeats operation 605 to operation 610. For example, provided that the inactivation timer is 200 ms and the predetermined number of times is "9," operation 605 to operation 610 are performed at each time of 3, 5, 8, 16, 30, 50, 80, 130, and 200 ms. After that, if the average power values are calculated for all of the time periods as a result of the check, the wireless terminal approximates the average power values measured according to the transmission time of the UDP packets, for example, through an exponential function as shown in FIG. 6b in operation 620. Then, in operation 625, contrary to operation 605, the measuring server periodically transmits the UDP packets to the wireless terminal, and the wireless terminal receives the same, and measures the elapsed time to the minimum unit decrease time of the wireless terminal in order to thereby calculate the average power value in the same manner as described in operation 605. In addition, as in the operation 610, the average power values measured in every time period corresponding to the time corresponding to a predetermined number of times is approximated by an exponential function as shown in FIG. 6b. Thus, in operation 630, the wireless terminal: discovers parameters indicating the exponential function; calculates the required amount of power saving or the required amount of additional delay time by estimating the power consumption based on the parameters; and transmits the same, as the modeling result parameters, to the measuring server. Then, as described above, the measuring server stores the modeling result parameters in its own DB. Then, the measuring server may derive the average amount of power consumption that corresponds to the time interval for the transmission of the UDP packets by using the modeling result parameters. More specifically, the average amount of power consumption corresponding to the time interval may be calculated by multiplying the time corresponding to the time interval and the average power value corresponding to the time.

Meanwhile, in addition to the method in which the wireless terminal obtains the average amount of power consumption by using the average power value for each time period, which is calculated by measuring the amount of battery level variation, another embodiment of the present invention may store and use the modeling result of the amount of power consumption, which is pre-performed, according to the type of wireless terminal.

FIG. 6b illustrates an example of a result of the estimated power consumption pattern of the wireless terminal, according to an embodiment of the present invention. FIG. 6b shows a graph that is obtained by approximating the average amount of power consumption according to the packet transmission period, which is estimated according to the operations of FIG. 6a, through an exponential function.

Meanwhile, the present invention may obtain the PSM parameters of the wireless communication chipset without a cross-layer information exchange between the application layer of the wireless terminal and lower layers. In addition, a clustering condition for the wireless communication between the measuring server and the wireless terminal may be set by using the trade-off relationship between the amount of power consumption and the time delay through the PSM parameters obtained above.

Figure 7:
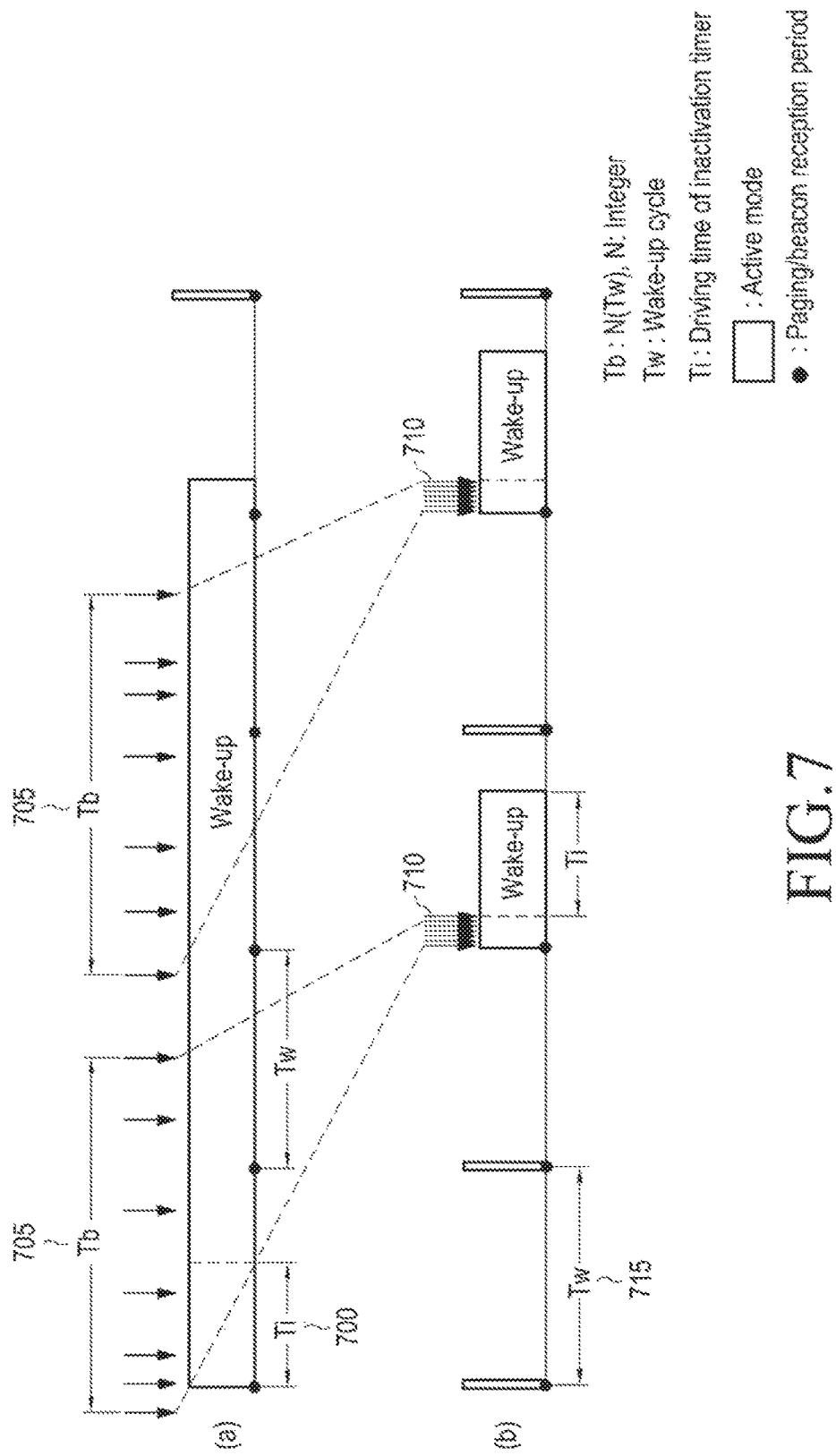
FIG. 7 illustrates the operation of the wireless terminal according to an example of conditions for a clustering cycle, which is set by using a trade-off relationship between the amount of power consumption and the time delay, according to an embodiment of the present invention.

FIG. 7 illustrates the operation of the wireless terminal according to an example of conditions for a clustering cycle, which is set by using a trade-off relationship between the amount of power consumption and the time delay, according to an embodiment of the present invention.

Diagram (a) of FIG. 7 shows the case where the time interval of the UDP packets transmitted to the wireless terminal is set to be shorter than the driving time (Ti) of the inactivation timer. In this case, since the UDP packets continue to be received from the measuring server within the time 700 corresponding to the driving time of the inactivation timer, the inactivation timer continues to be updated. Therefore, the wireless communication chipset of the wireless terminal continues to remain in the wake-up state to maintain the power-on state, and thus cannot enter the PSM mode.

However, the application layer of the measuring server, according to the embodiment of the present invention, recognizes the driving time of the inactivation timer and the wake-up cycle. In addition, it is assumed that the traffic provided by the application allow the time delay for a while. Then, the measuring server may increase the time to enter the PSM mode of the wireless terminal by adjusting the time interval of the UDP packets as shown in diagram (b) of FIG. 7 in order to thereby reduce the amount of power consumption. More specifically, the measuring server clusters the UDP packets to be transmitted to the wireless terminal for a specific period of time (Tb) 705 (hereinafter, referred to as a 'clustering cycle') in the buffer without directly transmitting the same to the wireless terminal. In addition, after the specific period of time (Tb) 705, the measuring server transmits the UDP packets 710, which have been clustered in the buffer, to the wireless terminal at once during the upcoming wake-up cycle of the wireless terminal. The clustering cycle, according to the embodiment of the present invention, is set to be an integer multiple of the wake-up cycle (Tw) 715 of the wireless terminal in order to more accurately estimate the PSM mode operation of the wireless terminal. In this case, if the driving time of the inactivation timer is longer than the wake-up cycle, the clustering cycle should be set to be an integer multiple of the wake-up cycle (N*Tw, wherein N is an integer) such that the clustering cycle is always greater than the driving time of the inactivation timer.

Figure 8:
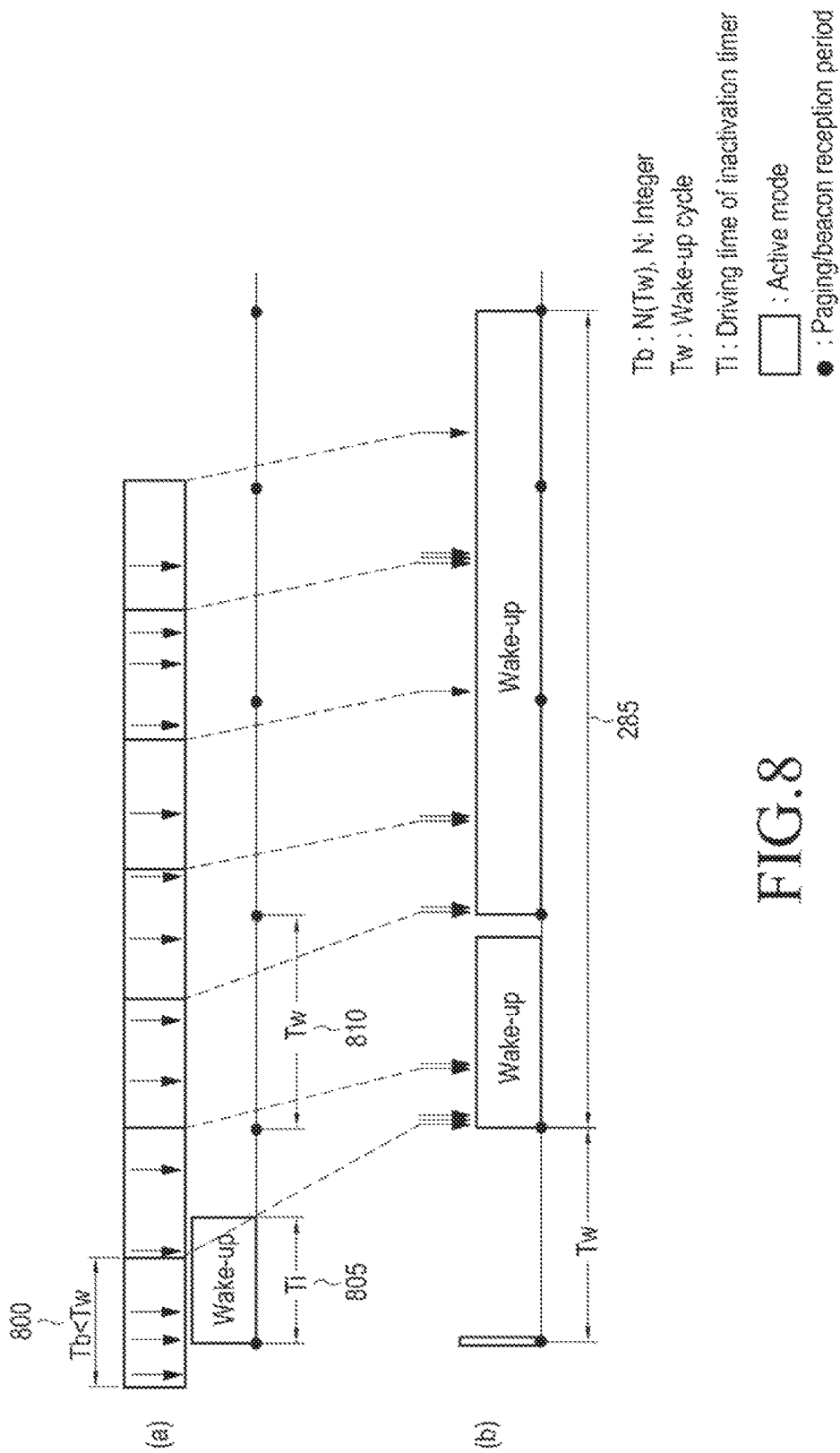
FIG. 8 is a view to explain an example of the operation of the wireless terminal that enters a PSM mode according to the clustering cycle, according to an embodiment of the present invention.

FIG. 8 is a view to explain an example of the operation of the wireless terminal that enters the PSM mode according to the clustering cycle, according to an embodiment of the present invention. Here, the embodiment shows that the wireless terminal can hardly enter the PSM mode because of an incorrect setting of the clustering cycle.

Referring to diagram (a) of FIG. 8, it shows that the wake-up cycle 810 is longer than the driving time 805 of the inactivation timer (Tw>Ti). Since the clustering cycle 800 is set to be smaller than the wake up cycle in diagram (a) of FIG. 8, it is difficult for the wireless terminal to enter the PSM mode or to estimate the entry timing into the PSM mode, and therefore, the chipset continues to remain in the wake-up state that maintains the power-on state.

Figure 9:
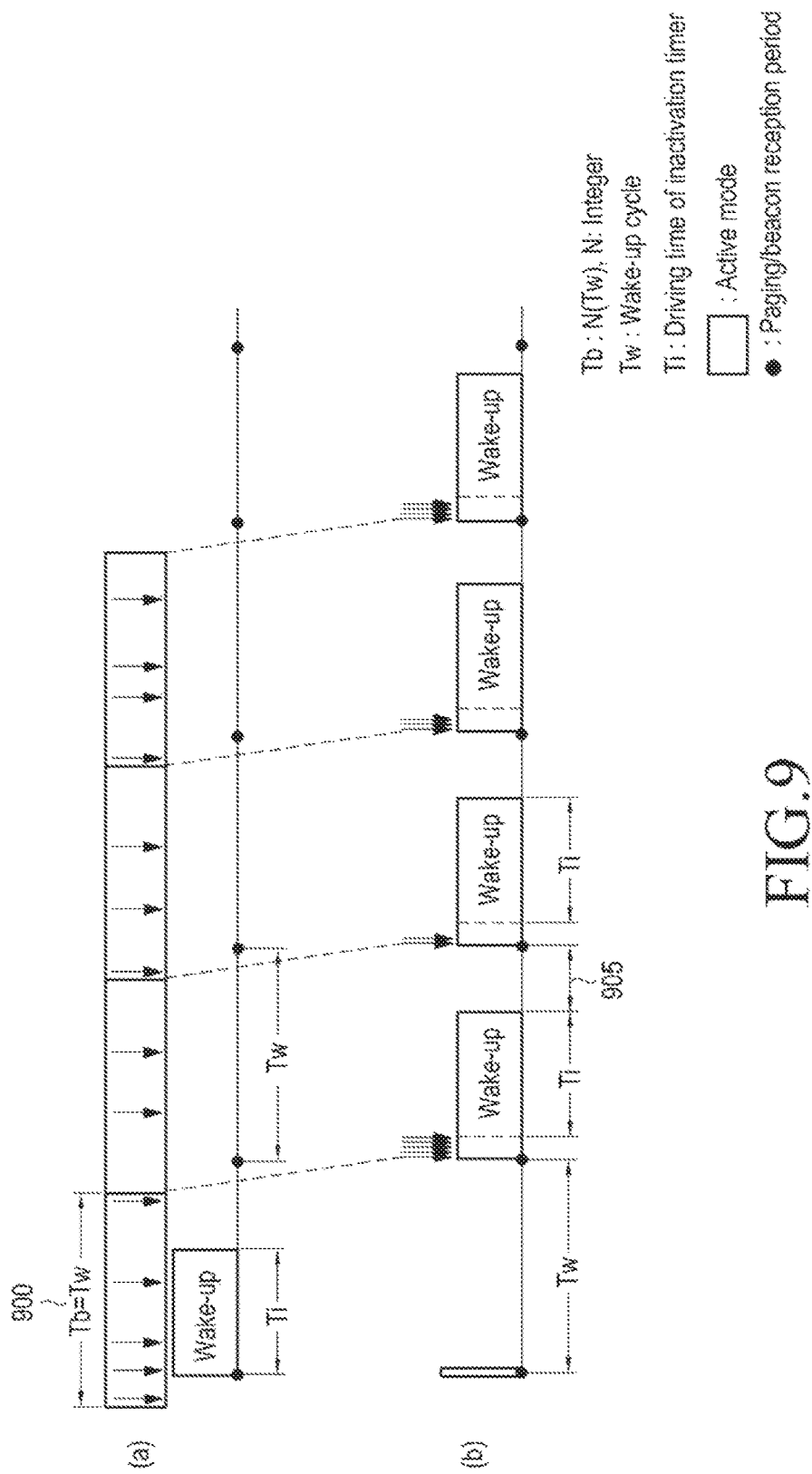
FIG. 9 is a view to explain another example of the operation of the wireless terminal that enters a PSM mode according to the clustering cycle, according to an embodiment of the present invention.

FIG. 9 is a view to explain another example of the operation of the wireless terminal that enters the PSM mode according to the clustering cycle, according to an embodiment of the present invention.

Diagram (a) of FIG. 9 shows that the clustering cycle is set to be the same as the wake up cycle (Tb=Tw). In this case, the wireless terminal may enter the PSM mode for the time period 905 from the end time of the inactivation timer to the paging/beacon reception period in order to thereby turn off the power of the chip set. Accordingly, the wireless terminal may periodically and more easily estimate the additional delay time and the reduction amount of power consumption.

Figure 10:
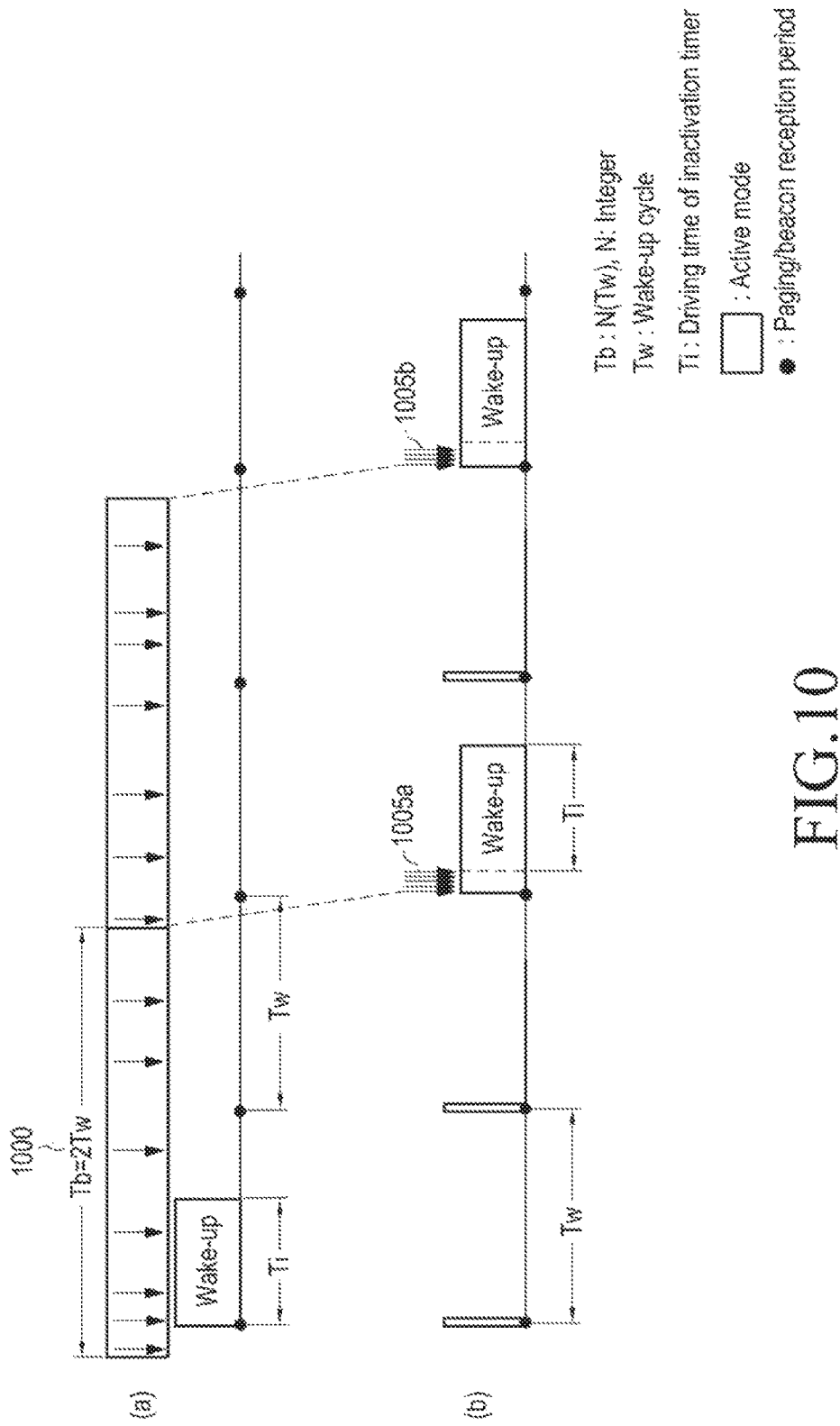
FIG. 10 illustrates an example in which the clustering cycle is set to be an integer multiple of a wake-up cycle.

Meanwhile, in order to increase the reduction amount of power consumption while allowing an increase in the average additional delay time, the clustering cycle may be set to be an integral multiple of the wake up cycle. FIG. 10 illustrates an example in which the clustering cycle is set to be an integer multiple of the wake-up cycle. As shown in the reference numeral 1000 of diagram (a) in FIG. 10, the clustering cycle is set to be double the wake up cycle (Tb=2Tw). Referring to diagram (b) of FIG. 10, the wireless terminal receives, from the measuring server, the clustered packets in every odd-numbered paging/beacon reception period 1005*a* or 1005*b* from the third paging/beacon reception period. Accordingly, the wireless terminal may enter the PSM mode in the period 'from the end time of the driving time of the inactivation timer following the odd-numbered paging/beacon reception period to the even-numbered paging/beacon reception period,' and in the period 'from the even-numbered paging/beacon reception period to the next paging/beacon reception period' in order to thereby reduce the amount of power consumption.

Figure 11:
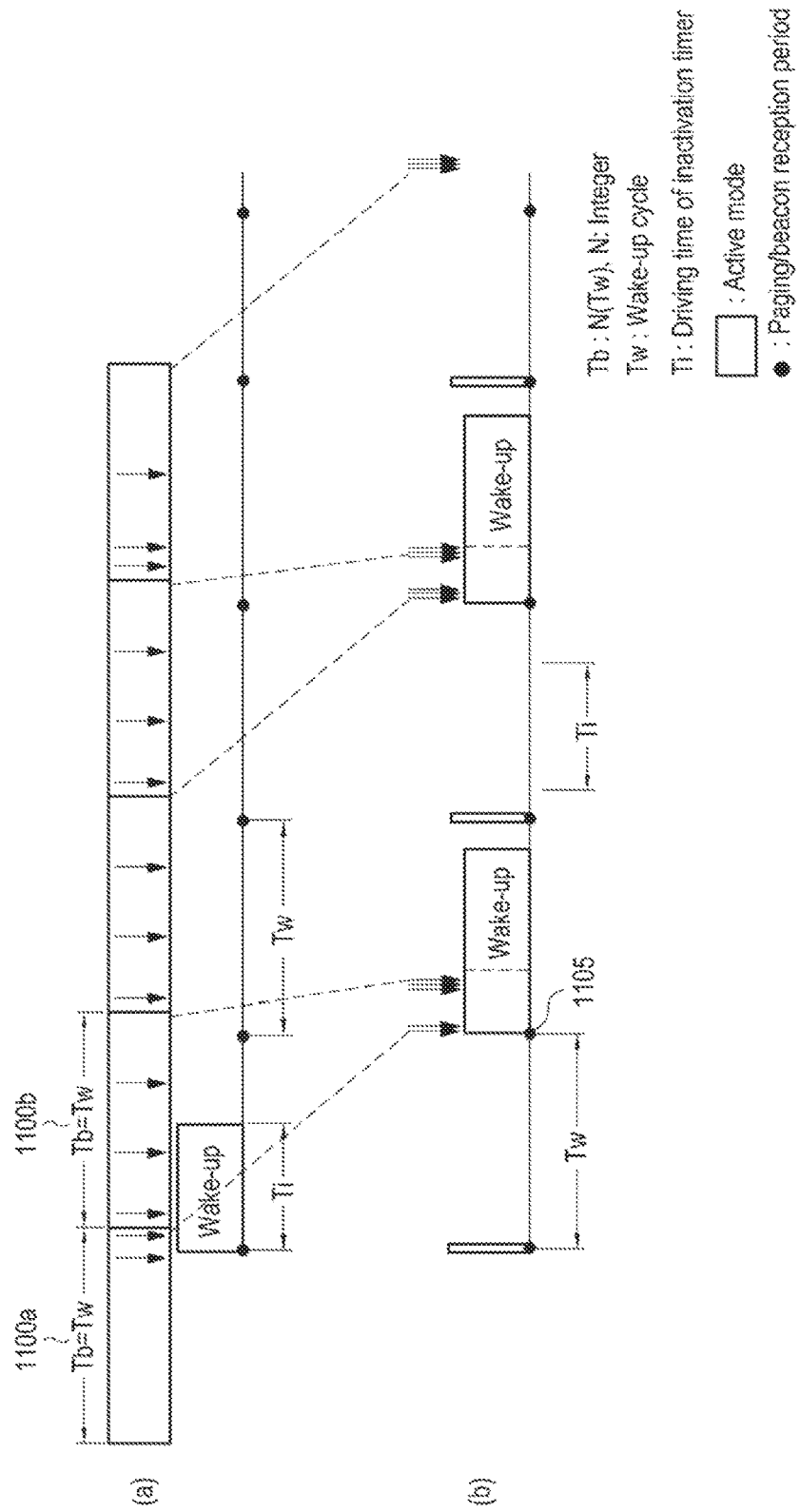
FIG. 11 illustrates an example in which the cluster transmission time of a measuring server does not match the wake-up cycle of a wireless terminal in timing when the clustering cycle matches the wake-up cycle.

Meanwhile, in the case where the clustering cycle matches the wake up cycle as shown in diagrams (a) and (b) of FIG. 9, the cluster transmission time in the measuring server may not match the wake-up cycle of the wireless terminal in its timing. Referring to FIG. 11, which illustrates such a situation, the packets that are clustered through the first clustering cycle 1100*a* are received from the measuring server during the paging/beacon reception time 1105 of the wireless terminal. Thereafter, the packets that are clustered through the second clustering cycle 1100*b* are received during the driving time of the inactivation timer following the paging/beacon reception time 1105, in order to thereby update the inactivation timer. According to this, even though the wireless terminal sets the clustering cycle according to the same condition as FIG. 9, the operation period of the PSM mode may be shortened compared to the embodiment of FIG. 9. In this case, the cluster transmission timing for transmitting the clustered packets is required to be corrected. The measuring server recognizes that the wireless terminal is to operate according to FIG. 9 in the case of Tb=Tw. Therefore, the measuring server identifies the distribution of the intervals at which the responses to the clustered packets are received from the wireless terminal, and delays, little by little, the transmission intervals of the clustered packets according to the identified interval distribution. In addition, the measuring server identifies the distribution of the intervals at which the responses to the clustered packets, which have been transmitted according to the delayed clustering transmission intervals, and performs the correction of the transmission timing such that the cluster transmission timing matches the paging signal/beacon reception period of the wireless terminal. That is, the wireless terminal, according to the embodiment of the present invention, transmits a report message on the clustered packets, which have been received for a predetermined period of time, to the measuring server periodically or by a request of the measuring server so that the measuring server recognizes the operation state of the wireless terminal according to the reception of the clustered packets. More specifically, the wireless terminal may determine whether or not the received packet exists in the same cluster through a predetermined time threshold (Tth). For example, provided that Tth=10 ms, the packets, which are consecutively received within an interval of 10 ms, may be regarded to be included in the same cluster. In addition, at the moment when it exceeds 10 ms, the wireless terminal determines that the reception of the corresponding cluster is complete, and transmits the report message on the cluster to the measuring server. Then, the measuring server may use the reception time of the report message for the RTT calculation with respect to the transmission and reception of the cluster. Then, the measuring server identifies the indication information through the report message, and, based on the same, figures out whether or not there is a malfunction according as the wireless terminal identifies the reception timing of the corresponding cluster, in order to thereby perform the timing correction operation. According to another embodiment, in the case where the measuring server and the wireless terminal are wirelessly connected with each other through a TCP (Transmission control protocol), the wireless terminal transmits the report message be means of ACK. Therefore, the measuring server may identify the operating state of the wireless terminal for the clustering reception through the reception interval of the ACK that is received from the wireless terminal.

Figure 12:
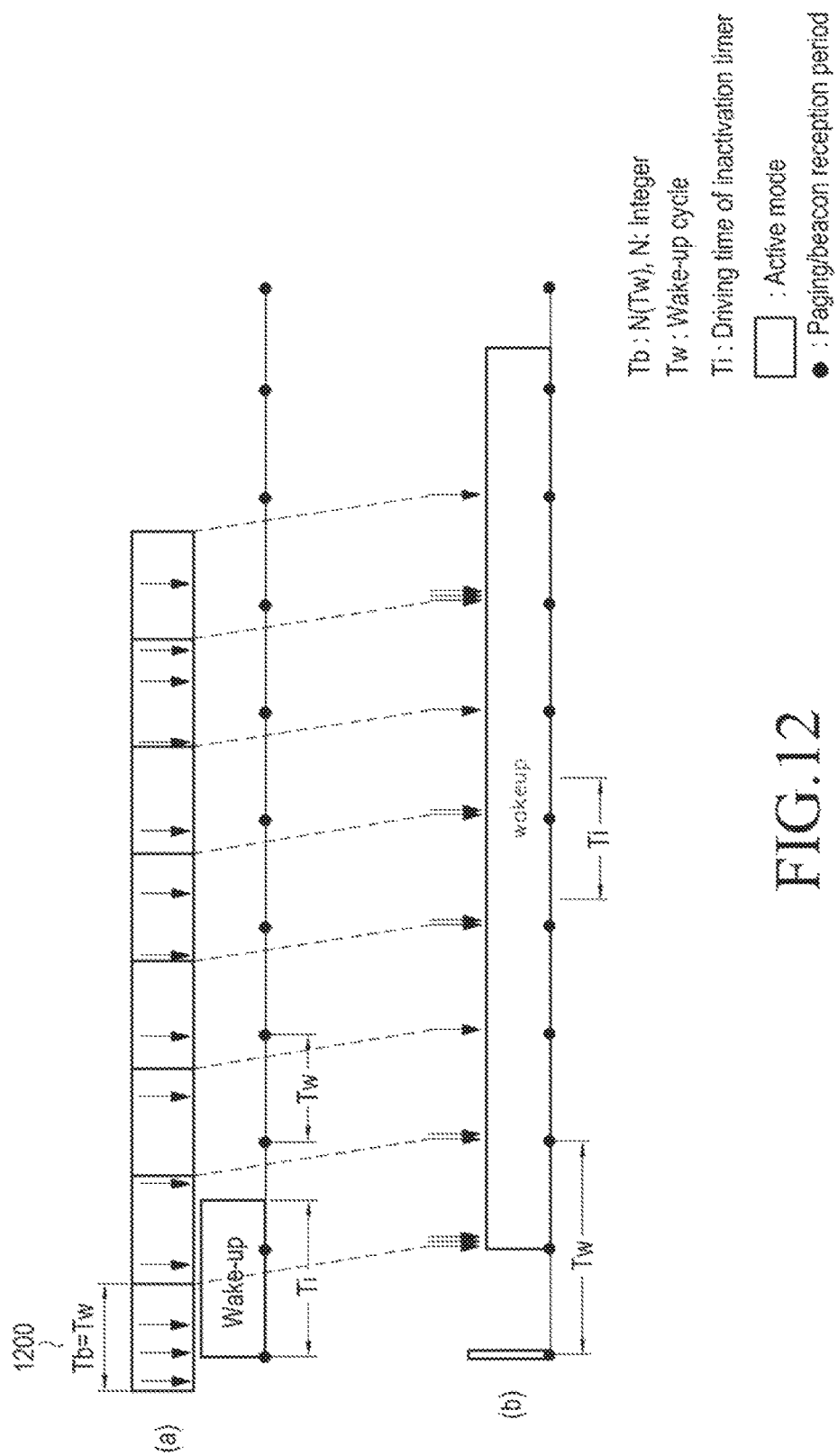
FIG. 12 illustrates an example in which the clustering cycle is set to be the same as the wake-up cycle when the driving time of the inactivation timer is longer than the wake-up cycle.

FIG. 12 illustrates an example in which the clustering cycle is set to be the same as the wake-up cycle when the driving time of the inactivation timer is longer than the wake-up cycle.

As shown in diagram (a) of FIG. 12, the clustering cycle 1200 is set to be the same as the wake-up cycle. In this case, the packets, which are clustered in every clustering cycle, always arrive within the inactivation timer of the wireless terminal. Accordingly, the terminal is not able to enter the PSM mode, and remains in the wake-up state as shown in diagram (b) of FIG. 12. Therefore, the clustering cycle, according to the embodiment of the present invention, should always be set to be greater than the driving time of the inactivation timer.

Figure 13:
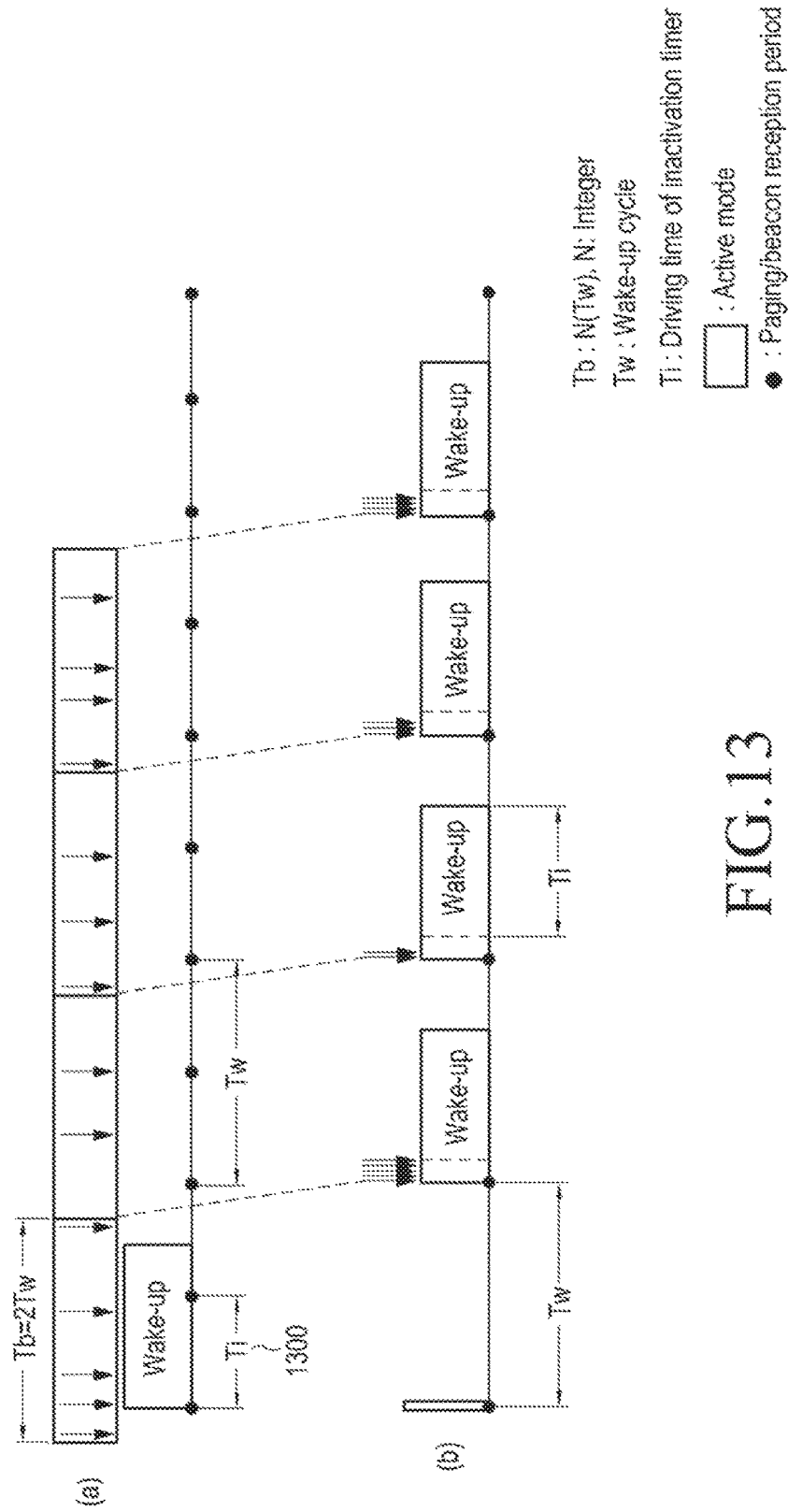
FIG. 13 illustrates an example in which the clustering cycle of FIG. 12 has been adjusted.

FIG. 13 illustrates an example in which the clustering cycle of FIG. 12 has been adjusted.

Referring to diagram (a) of FIG. 13, since the wake-up cycle is shorter than the driving time of the inactivation timer, the clustering cycle 1200 in diagram (a) of FIG. 12, which is set to be the same as the wake-up cycle, is to be adjusted to double the wake-up cycle (1300). The clustering cycle 1300, which is adjusted according thereto, becomes longer than the driving time of the inactivation timer. Therefore, when the clustered packets are received during the even-numbered paging signal/beacon reception periods, and the driving time of the inactivation timer following the even-numbered paging signal/beacon reception periods of the wireless terminal expires, the wireless terminal enters the PSM mode.

Meanwhile, the wireless terminal, according to the embodiment of the present invention, may estimate the amount of its own power consumption according to the pattern of packets received from the measuring server by using the modeling result according to the power consumption pattern obtained as described above. In addition, based on the estimated amount of power consumption, the required amount of power saving or the required amount of additional delay time is calculated. In addition, if it is determined that the additional reduction in the power consumption or the reduction in the additional delay time is required, the wireless terminal transmits, to the measuring server, the amount of power saving that is additionally required. Then, the measuring server may increase the clustering cycle in order to satisfy the additionally required amount of power saving, and may reduce the clustering cycle in order to satisfy the additionally required reduction in the additional delay time. In addition, the measuring server may transmit, to the wireless terminal, the packets that are clustered to correspond to the adjusted clustering cycle in order to thereby satisfy the amount of power saving and the amount of reduction in the additional delay time, which are additionally required by the wireless terminal.

Figure 14:
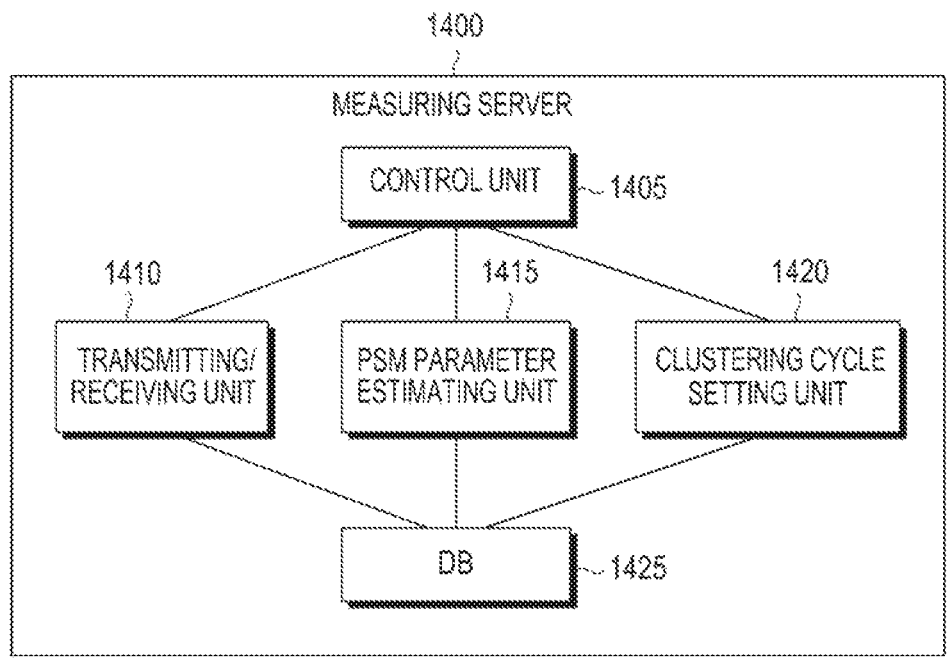
FIG. 14 illustrates an example of the configuration of the measuring server, according to an embodiment of the present invention.

FIG. 14 illustrates an example of the configuration of the measuring server, according to an embodiment of the present invention.

Referring to FIG. 14, the measuring server 1400 includes a control unit 1405, a transmitting/receiving unit 1410, a PSM parameter estimating unit 1415, a clustering cycle setting unit 1420, and a DB 1425. The components constituting the measuring server 1400 of FIG. 14 are illustrated as an example, and may be combined with each other for the same configuration, or may be separated into sub-units for each detailed operation.

The transmitting/receiving unit 1401 receives, from the wireless terminal, a triggering packet that makes a request for measuring the PSM parameters. In addition, the transmitting/receiving unit 1401 may transmit, to the wireless terminal, the UDP packets corresponding to a predetermined cycle according to the control of the control unit 1405, and may receive the responses thereto. In addition, the transmitting/receiving unit 1401 may transmit, to the wireless terminal, the packets that are clustered with the UDP packets that are generated in the clustering cycle under the control of the control unit 1405.

The control unit 1405 checks whether or not the PSM parameters of the corresponding wireless terminal are registered in the DB 1425. If the check finds that there is no registered PSM parameter, the control unit calculates the RTT by using the transmission time of the UDP packet and the response thereto, and controls the PSM parameter estimating unit 1415 to estimate the PSM parameters based on the same. The operation of estimating the PSM parameters corresponds to the operation of estimating the driving time of the inactivation timer and the wake-up cycle described in FIG. 4a and FIG. 4b, so the description thereof will be omitted here.

In addition, the control unit 1405 stores the PSM parameters, which are estimated by the PSM parameter estimating unit 1415, to be mapped with the corresponding terminal.

In addition, the control unit 1405 checks whether or not the modeling-related parameters for the reduction amount of power consumption of the corresponding terminal are registered in the DB 1425. If the modeling-related parameters are not registered in the DB, the control unit instructs the terminal to perform the modeling for the reduction amount of power consumption through the transmitting/receiving unit 1410, and when it is identified that the modeling result-related parameters are received from the wireless terminal, the control unit registers the parameters in the DB 1425. In addition, if it is identified that the PSM parameters for the wireless terminal and the modeling result-related parameters are registered in the DB 1425, the control unit 1405 controls the clustering cycle setting unit 1420 to set the clustering cycle by using the same. The clustering cycle setting unit 1420 sets the clustering cycle by using trade-off relationship between the amount of power consumption and the time delay, which is illustrated in FIG. 7 to FIG. 1 above, such that the clustering cycle is longer than the driving time of the inactivation timer of the wireless terminal. In addition, when the control unit 1405 receives, from the wireless terminal, the amount of power saving or the amount of additional delay time that is additionally required, the control unit 1405 controls the clustering cycle setting unit 1420 to adjust the clustering cycle to correspond thereto.

Figure 15:
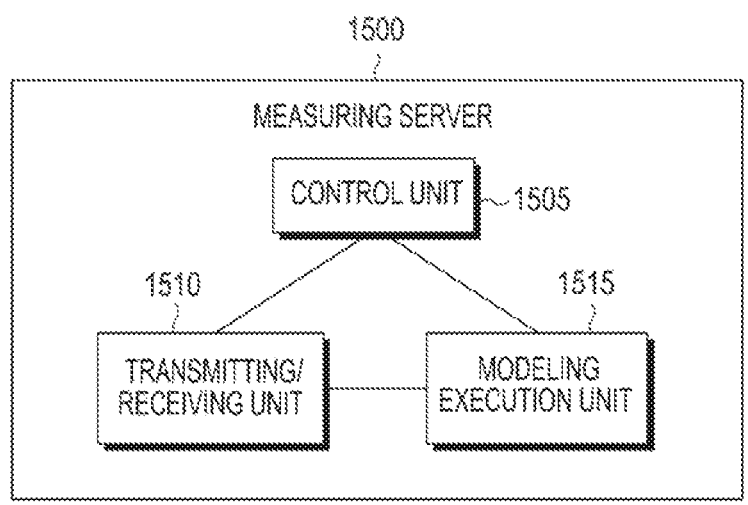
FIG. 15 illustrates an example of the configuration of the wireless terminal, according to an embodiment of the present invention.
Figure 16A:
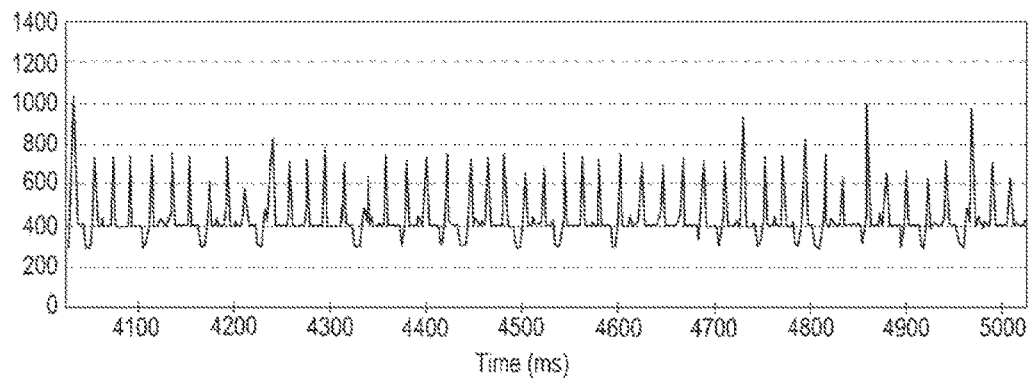
FIG. 16a and FIG. 16b are graphs showing the distribution of the amount of power consumption according to a packet transmission/reception pattern between the measuring server and the wireless terminal when the driving time of the inactivation timer is 200 ms and the wake-up cycle is 307.2 ms in the WiFi scheme as an example of the access networks.
Figure 16B:
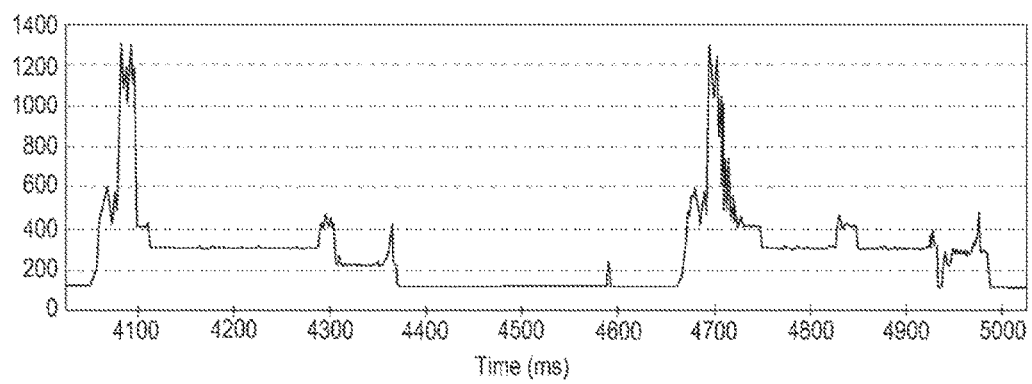
Figure 17:
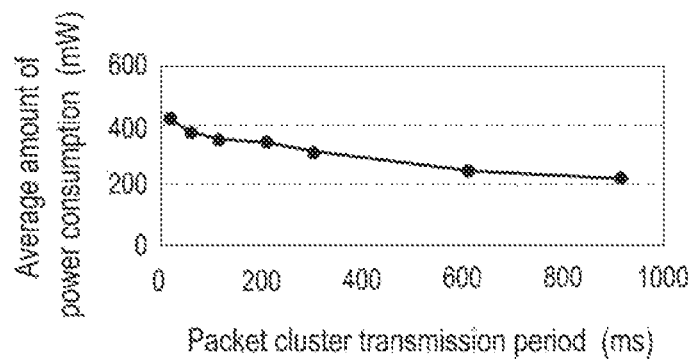
FIG. 17 shows a graph of the average amount of power consumption compared to the clustering cycle in the experimental environment of FIG. 16b.

FIG. 15 illustrates an example of the configuration of the wireless terminal, according to an embodiment of the present invention.

Referring to FIG. 15, the wireless terminal 1500 includes a control unit 1505, a transmitting/receiving unit 1510, and a modeling execution unit 1515. Likewise, the components constituting the wireless terminal 1500 are illustrated as an example, and may be combined with each other for the same configuration, or may be separated into sub-units for each detailed operation.

The control unit 1505 transmits, to the measuring server, a triggering packet that makes a request for measuring the PSM parameters for reducing the power consumption through the transmitting/receiving unit 1510. In addition, the transmitting/receiving unit 1510 receives the UDP packets from the measuring server, and transmits the responses to the UDP packets to the measuring server. In addition, when the clustered packets are received, according to the embodiment of the present invention, the transmitting/receiving unit 1510 transmits a report on the same under the control of the control unit 1505.

When the control unit 1505 obtains its own inactivation timer driving time and wake-up cycle from the measuring server, the control unit 1505 controls the modeling execution unit 1515 to perform the modeling for the amount of power consumption according to the operations described in FIG. 6*a*. In addition, the control unit 1505 transmits the modeling result parameters, which are obtained through the modeling execution unit 1515, to the measuring server through the transmitting/receiving unit 1510. The control unit 1505 may estimate the amount of its own power consumption according to the pattern of the packets received from the measuring server by using the modeling result. In addition, the control unit 1505 may calculate the required amount of power saving or the required amount of additional delay time based on the estimated amount of power consumption, and controls the transmitting/receiving unit 1510 to transmit the corresponding information to the wireless terminal.

Although the embodiment has been described in the detailed description of the present invention, the present invention may be modified in various forms without departing from the scope of the present invention. Thus, the scope of the present invention shall not be determined merely based on the described exemplary embodiments and rather determined based on the accompanying claims and the equivalents thereto.

The invention claimed is:

1. A method for reducing power consumption of a wireless terminal, the method comprising:
    receiving a triggering packet from the wireless terminal;
    estimating a parameter that is related to a reduction in the power consumption of the wireless terminal;
    receiving a condition that contains a reduction amount of power consumption and delay time-related information; setting a cycle for clustering packets to be transmitted to the wireless terminal to correspond to the condition; and
    performing wireless communication with the wireless terminal based on the set cycle.

2. The method of claim 1, wherein estimating the parameter comprises:
    receiving responses to first packets that are transmitted to the wireless terminal in every first cycle that is predetermined;
    letting the wireless terminal wake up in a paging/beacon reception period by using transmission/reception time values of the first packets; and
    estimating the parameter that is related to a reduction in the power consumption of the wireless terminal,
    wherein the parameter comprises a driving time of a timer to wait for a reception of additional packets following a time when receiving a last packet.

3. The method of claim 2, further comprising:
    transmitting second packets to the wireless terminal in every second cycle that is set to be longer, by a certain value, than the estimated driving time;
    receiving responses to the transmitted second packets; and
    estimating a wake-up cycle of the paging/beacon reception period by using transmission/reception time values of the second packets.

4. The method of claim 3, further comprising:
    transmitting, to the wireless terminal, information related to the driving time of the timer and the wake-up cycle.

5. The method of claim 4, wherein if the driving time is greater than the wake-up cycle, the set cycle is longer than the driving time.

6. The method of claim 1, wherein performing the wireless communication comprises:
    clustering the packets to be transmitted to the wireless terminal within the set cycle;
    transmitting the clustered packets to the wireless terminal at the time corresponding to the set cycle; and
    receiving a reception result report on the clustered packets from the wireless terminal; and
    adjusting the set cycle by using the reception result report.

7. A method for reducing power consumption of a wireless terminal, the method comprising:
    instructing a server, which supports an application for applying a reduction in the power consumption, to estimate parameters that are related to the reduction in the power consumption;
    receiving the parameters from the server, setting a condition that contains a reduction amount of power consumption and delay time-related information based on the parameters; and
    performing wireless communication with the server according to a cycle for clustering packets to be received from the server, the cycle being set to correspond to the condition.

8. The method of claim 7, wherein:
    the parameters comprise a transmission time of first packets that are received from the server in every first cycle, which is predetermined and a driving time of a timer which is estimated by using transmission/reception time values of responses to the first packets, and
    wherein the driving time is intended to wait for a reception of additional packets following a time when receiving a last packet after the wireless terminal wakes up in a paging/beacon reception period.

9. The method of claim 8, wherein the parameters further comprise a wake-up cycle of the paging/beacon reception period, which is estimated by using transmission/reception time values of second packets that are received from the server in every second cycle that is set to be longer, by a certain value, than the estimated driving time.

10. The method of claim 9, wherein setting the condition comprises:
    receiving responses to a third packets that are transmitted to the server;
    calculating an average amount of power consumption for each transmission interval of the third packets by using transmission/reception time values of the third packets; and
    setting the condition that contains the reduction amount of power consumption and the delay time-related information, by using the calculated average amount of power consumption and the parameters.

11. The method of claim 10, wherein if the driving time is greater than the wake-up cycle, the set cycle is longer than the driving time.

12. A server for reducing power consumption of a wireless terminal, the server comprising:
    a control unit configured to:
        receive a triggering packet from the wireless terminal,
        estimate a parameter that is related to a reduction in the power consumption of the wireless terminal, and
        receive a condition that contains a reduction amount of power consumption and delay time-related information, set a cycle for clustering packets to be transmitted to the wireless terminal to correspond to the condition; and
a transmitting/receiving unit configured to perform wireless communication with the wireless terminal based on the set cycle under control of the control unit.

13. The server of claim 12, wherein the control unit is further configured to:
receive responses to first packets that are transmitted to the wireless terminal in every first cycle that is predetermined;
allow the wireless terminal to wake up in a paging/beacon reception period by using transmission/reception time values of the first packets; and
estimate the parameters that is related to a reduction in the power consumption of the wireless terminal,
wherein the parameter comprises a driving time of a timer to wait for a reception of additional packets following a time when receiving a last packet.

14. The server of claim 13, wherein the control unit is further configured to:
transmit second packets to the wireless terminal in every second cycle that is set to be longer, by a certain value, than the estimated driving time;
receive responses to the transmitted second packets; and
estimate a wake-up cycle of the paging/beacon reception period by using transmission/reception time values of the second packets.

15. The server of claim 14, wherein the control unit is configured to:
transmit, to the wireless terminal, information related to the driving time of the timer and the wake-up cycle.

16. The server of claim 15, wherein if the driving time is greater than the wake-up cycle, the set cycle is longer than the driving time.

17. The server of claim 12, wherein the control unit is configured to:
cluster the packets to be transmitted to the wireless terminal within the set cycle;
transmit the clustered packets to the wireless terminal at a time corresponding to the set cycle;
receive a reception result report on the clustered packets from the wireless terminal; and
adjust the set cycle by using the reception result report.

18. A wireless terminal for reducing power consumption, the wireless terminal comprising:
a control unit configured to:
instruct a server, which supports an application for applying a reduction in the power consumption, to estimate parameters that are related to the reduction in the power consumption;
receive the parameters from the server through a transmitting/receiving unit, and
set a condition that contains a reduction amount of power consumption and delay time-related information based on the parameters; and
the transmitting/receiving unit configured to perform wireless communication with the server according to a cycle for clustering packets to be received from the server, the cycle being set to correspond to the condition under control of the control unit.

19. The wireless terminal of claim 18, wherein:
the parameters comprise a transmission time of a first packets that are received from the server in every first cycle, which is predetermined, and a driving time of a timer, which is estimated by using transmission/reception time values of responses to the first packet, and
wherein the driving time is intended to wait for a reception of additional packets following a time when receiving a last packet after the wireless terminal wakes up in a paging/beacon reception period.

20. The wireless terminal of claim 19, wherein the parameters further comprise a wake-up cycle of the paging/beacon reception period, which is estimated by using transmission/reception time values of second packets that are received from the server in every second cycle that is set to be longer, by a certain value, than the estimated driving time.

21. The wireless terminal of claim 20, wherein
the control unit is configured to:
receive responses to a third packets that are transmitted to the server,
calculate an average amount of power consumption for each transmission interval of the third packets by using transmission/reception time values of the third packets, and
set the condition that contains the reduction amount of power consumption and the delay time-related information, by using the calculated average amount of power consumption and the parameters.

22. The wireless terminal of claim 21, wherein if the driving time is greater than the wake-up cycle, the set cycle is longer than the driving time.

* * * * *